US010016334B2

United States Patent
Lydecker et al.

(10) Patent No.: US 10,016,334 B2
(45) Date of Patent: *Jul. 10, 2018

(54) SYSTEM AND METHOD TO ASSIST USERS HAVING REDUCED VISUAL CAPABILITY UTILIZING LIGHTING DEVICE PROVIDED INFORMATION

(71) Applicant: ABL IP Holding LLC, Conyers, GA (US)

(72) Inventors: Stephen H. Lydecker, Snellville, GA (US); David P. Ramer, Reston, VA (US); Jack C. Rains, Jr., Herndon, VA (US); Januk Aggarwal, Tysons Corner, VA (US)

(73) Assignee: ABL IP HOLDING LLC, Conyers, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/299,668

(22) Filed: Oct. 21, 2016

(65) Prior Publication Data

US 2017/0035645 A1   Feb. 9, 2017

Related U.S. Application Data

(63) Continuation of application No. 14/711,236, filed on May 13, 2015, now Pat. No. 9,536,452.

(51) Int. Cl.
*A61H 3/06* (2006.01)
*G09B 21/00* (2006.01)
(Continued)

(52) U.S. Cl.
CPC .......... *A61H 3/061* (2013.01); *G01C 21/206* (2013.01); *G02B 27/017* (2013.01);
(Continued)

(58) Field of Classification Search
None
See application file for complete search history.

(56) References Cited

U.S. PATENT DOCUMENTS 6,320,496 B1   11/2001   Sokoler et al.
6,807,478 B2   10/2004   Giannopoulos et al.
(Continued)

FOREIGN PATENT DOCUMENTS

WO       2007072285 A1   6/2007

OTHER PUBLICATIONS

Nakajima, Madoka, and Shinichiro Haruyama. "New indoor navigation system for visually impaired people using visible light communication." EURASIP Journal on Wireless Communications and Networking 2013.1 (2013): 37.*
(Continued)

*Primary Examiner* — Ryan M Gray
(74) *Attorney, Agent, or Firm* — RatnerPrestia

(57) ABSTRACT

A lighting device obtains data related to objects and boundaries in an area in the vicinity of the lighting device, and a user wearable device provides a display (e.g. an augmented reality display based on the data related to the objects and the area boundaries) for a user/wearer. The lighting device includes a mapping sensor that collects data related to the objects and boundaries in the area. The user wearable device includes a camera or other optical sensor and wireless communication capability. The user wearable device is provided with mapping data that is presented on a display of the user wearable device. The communications and display capabilities allow the user wearable device to obtain room mapping information related to area in the vicinity of the lighting device in order to provide navigational assistance to a visually impaired person in the area.

31 Claims, 5 Drawing Sheets

(51) Int. Cl.

| | | |
|---|---|---|
| *G02B 27/01* | (2006.01) | |
| *G06F 3/16* | (2006.01) | |
| *G10L 15/22* | (2006.01) | |
| *G06T 19/00* | (2011.01) | |
| *G09G 5/12* | (2006.01) | |
| *G01C 21/20* | (2006.01) | |
| *G06K 9/46* | (2006.01) | |

(52) U.S. Cl.
CPC ......... *G02B 27/0172* (2013.01); *G06F 3/167* (2013.01); *G06T 19/006* (2013.01); *G09B 21/007* (2013.01); *G09B 21/008* (2013.01); *G09G 5/12* (2013.01); *G10L 15/22* (2013.01); *G02B 2027/014* (2013.01); *G02B 2027/0138* (2013.01); *G02B 2027/0141* (2013.01); *G02B 2027/0178* (2013.01); *G06K 9/46* (2013.01); *G09G 2354/00* (2013.01); *G10L 2015/223* (2013.01)

(56) References Cited

U.S. PATENT DOCUMENTS

| | | |
|---|---|---|
| 8,520,065 B2 | 8/2013 | Staats et al. |
| 2014/0270796 A1 | 9/2014 | Jovicic et al. |
| 2015/0036016 A1 | 2/2015 | Jovicic |
| 2015/0130355 A1 | 5/2015 | Rains, Jr. et al. |
| 2015/0259078 A1 | 9/2015 | Filipovic et al. |
| 2015/0373482 A1 | 12/2015 | Barnard et al. |
| 2016/0035011 A1 | 2/2016 | Tuo et al. |

OTHER PUBLICATIONS

Hwang AD, Peli E. An augmented-reality edge enhancement application for Google Glass. Optometry and vision science: official publication of the American Academy of Optometry. Aug. 2014;91(8):1021.*

Velázquez, Ramiro. "Wearable assistive devices for the blind." Wearable and autonomous biomedical devices and systems for smart environment 75 (2010): 331-349.*

BrainPort Technologies, BrainPort ®V100, http://www.wicab.com/en_us, printed May 8, 2015.

Blind "See with sound", BBC News, article by Lakshmi Sandhana, Oct. 7, 2003, http://news.bbc.co.uk/2/hi/science/nature/3171226.stm, printed May 8, 2015.

By Alex Mindlin, Nolita, For Your Ears Only, New York Times, Dec. 9, 2007, printed on May 11, 2015.

"Refreshable Braille Display" Wikippedia, the free encyclopedia, http://en.wikipedia.org/wiki/Refreshable_braille_display, printed May 13, 2015.

Nakajima, Madoka, and Shinichiro Haruyama. "New indoor navigation system for visually impaired people using visible light communication." EURASIP Journal on Wireless Communications and Networking 2013.1 (2013): 1-10.

Hub, Andreas, Joachim Diepstratenm and Thomas Ertl. "Augmented Indoor Modeling for Navigation upport for t he Blind." CPSN. 2005.

Ran, Lisa, Sumi Helal, and Steve Moore. "Drishti: an integrated indoor/outdoor blind navigation system and service." Pervasive Cimputing and Communications, 2004. PerCOm 2004. Proceedings of the Second IEEE Annual Conference on. IEEE, 2004.

Yi, Chucai, et al. "Finding objects for assisting blind people." Network Modeling Analysis in Health Informatics and Bioinformatics 2.2 (2013): 71-79.

Entire prosecution history of U.S. Appl. No. 14/711,236, filed May 13, 2015, entitled "System and Method to Assist Users Having Reduced Visual Capability Utilizing Lighting Device Provided Information."

* cited by examiner

FIG. 4
400

```
Collecting mapping data of an
area                              410
```

```
Identifying objects
in the mapping data               420
```

430
```
In response to a request received from a user
device, provide mapping data and the
indications of the identified objects to the user
device
```

440
```
outputting navigational instructions
that indicate an unobstructed
pathway through the area
```

450
```
updating the mapping data of
an area of the premises
```

460
```
using the updated mapping data,
identifying objects in the area
```

470
```
comparing the first area mapping data including identified
object identifications to the updated mapping data and the
updated indications of the identified objects stored in
memory
```

480
```
generated updated mapping data and updated
indications of the identified objects to the user
device
```

490
```
update the outputted navigational
instructions to indicate an updated
unobstructed pathway through the area
```

SYSTEM AND METHOD TO ASSIST USERS HAVING REDUCED VISUAL CAPABILITY UTILIZING LIGHTING DEVICE PROVIDED INFORMATION

CROSS-REFERENCE TO RELATED APPLICATION

This application is a Continuation of application Ser. No. 14/711,236 filed May 13, 2015, which is hereby incorporated herein by reference in its entirety.

TECHNICAL FIELD

The present subject matter relates to techniques and equipment to provide a lighting device and a user device that assists a visually impaired user.

BACKGROUND

Electrical lighting has become commonplace in modern society. Electrical lighting devices are commonly deployed, for example, in homes, buildings of commercial and other enterprise establishments, as well as in various outdoor settings. Even in a relatively small state or country, there may be millions of lighting devices in use.

Traditional lighting devices have tended to be relatively dumb, in that they can be turned ON and OFF, and in some cases may be dimmed, usually in response to user activation of a relatively simple input device. Lighting devices have also been controlled in response to ambient light detectors that turn on a light only when ambient light is at or below a threshold (e.g. as the sun goes down) and in response to occupancy sensors (e.g. to turn on light when a room is occupied and to turn the light off when the room is no longer occupied for some period). Often traditional lighting devices are controlled individually or as relatively small groups at separate locations.

With the advent of modern electronics has come advancement, including advances in the types of light sources as well as advancements in networking and control capabilities of the lighting devices. For example, lighting devices include wireless communication systems that facilitate networking and may include sensors that detect environmental condition data relative to the location of the lighting device.

Despite advances in lighting technology, users with reduced visual capability need assistance beyond the mere more effective and efficient provision of light. A visually impaired person is a person whose visual capability is reduced to the point that medication nor glasses are able to restore the person's vision to a degree that the person can autonomously traverse an area without assistance, such as a walking cane, a personal assistant, service animal or the like. As used herein, a visually-impaired person is a person that requires visual assistance beyond glasses or that is completely blind. While visual augmentation systems have been proposed that utilize audio stimuli, such as the vOICe system, or tactile stimuli, such as the BrainPort® V100, which uses different signaling techniques applied through a mouthpiece, these systems are not widely supported by current infrastructure, either within buildings or outdoors.

There are a variety of situations in which it is desirable to obtain and utilize data to assist persons with impairments to vision and/or other senses.

BRIEF DESCRIPTION OF THE DRAWINGS

The drawing figures depict one or more implementations in accord with the present concepts, by way of example only, not by way of limitations. In the figures, like reference numerals refer to the same or similar elements.

FIG. 4 is a flow chart of a process for generating the area rendering example of visual assistance like that in FIG. 2.

DETAILED DESCRIPTION

Figure 1:
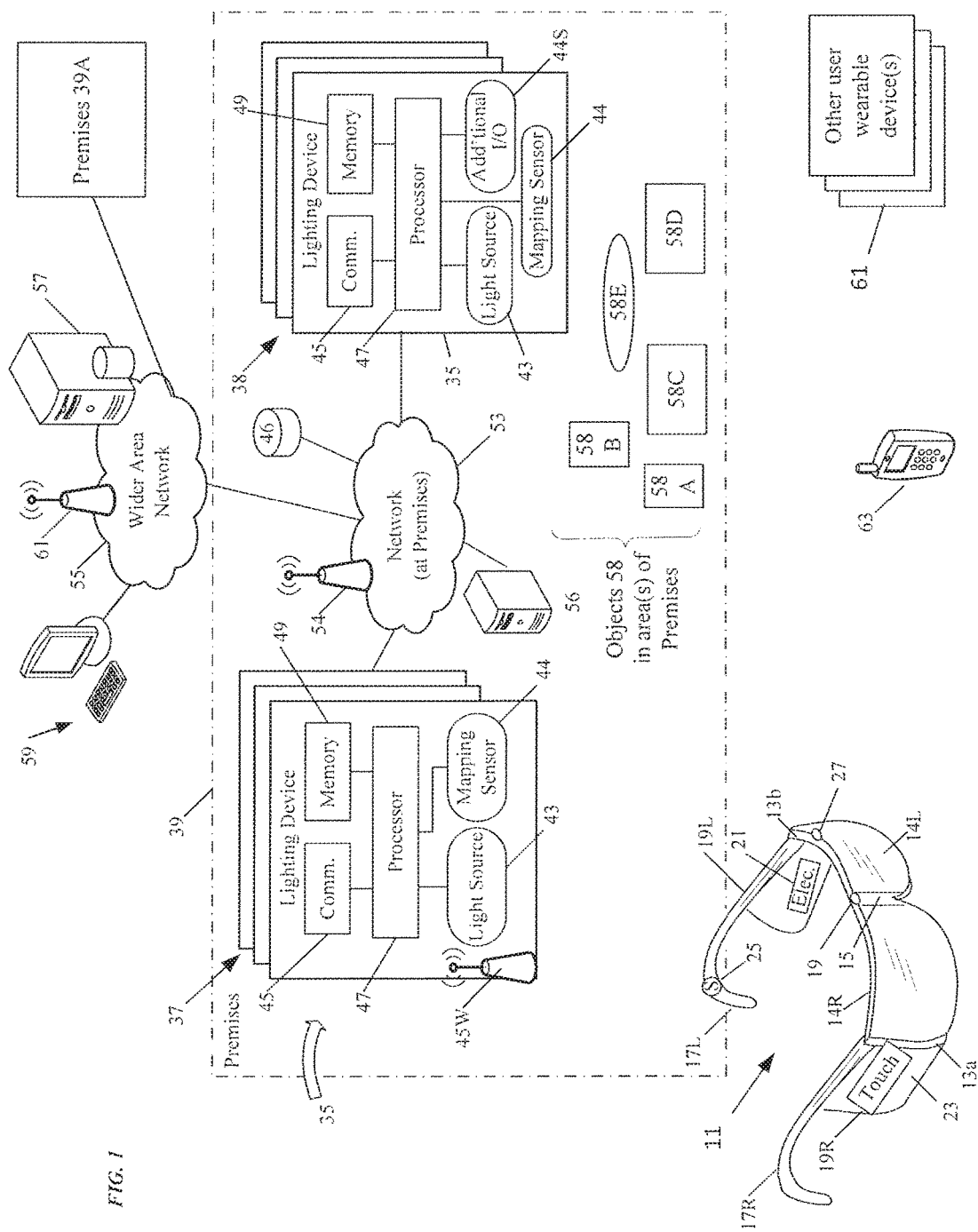
FIG. 1 depicts a stylized representation of an example of a user wearable device in the form of goggles or eyeglasses; and the drawing shows a number of elements in block diagram form with which the user wearable device may operate or interact when providing a system for navigational and other assistance (e.g., to a user having reduced vision capability).

The technology examples disclosed herein provide devices, programming and methodologies for improved navigational assistance to visually impaired users.

By way of an example, lighting related functions of the user wearable device may involve processing data obtained via a lighting device and/or a camera associated with the user wearable device. Based on the obtained data, the device wirelessly communicates to obtain data based on the data detected by the lighting device via a communication network. The device then presents information in the form of a user detectable stimuli via the user wearable device based on the obtained data to the user while wearing user interface device, via an output device, such as a display, a tactile output device, an audio output device, a gustatory-related output device, an olfactory-related output device, or the like.

By way of another example, the programming for the user wearable device may include an operating system and a navigation application. The operating system controls general operating functions of the user wearable device. The navigation application is configured for execution via the operating system, to enable the user wearable device to provide premises navigation instructions or indications to visually impaired persons.

In the following detailed description, numerous specific details are set forth by way of examples in order to provide a thorough understanding of the relevant teachings. However, it should be apparent to those skilled in the art that the present teachings may be practiced without such details. In other instances, well known methods, procedures, components, and/or circuitry have been described at a relatively high-level, without detail, in order to avoid unnecessarily obscuring aspects of the present teachings.

In several aspects, the examples discussed in the detailed description utilize or relate to a user wearable device for visually impaired navigational assistance related operations, such as indicating hazards or object locations in the vicinity of a user, such as a room, a facility, a sidewalk, or the like. As used herein, use of the term "user wearable" to describe a device is meant to broadly encompass any item of headgear, eyewear, clothing or apparel or other accessory, such as a handset control device, a smartphone or the like that can be worn or carried by a user. Examples of user wearable items include monocles, spectacles, eyeglasses, contact lenses and goggles; hats, helmets and visors; ornamental apparel (e.g. headpieces, earrings, etc.); as well as earphones, earmuffs and headphones or headsets; or the like. Other examples user wearable items include bracelets, necklaces, head and arm bands, other accessories, such as a purse, articles of clothing with embedded or attached electronics. The user wearable items may also include user sensory stimulation devices, such as, for example, devices that output vibrations, sounds (human audible), scents (e.g., a lavender scent indicates a chair), non-dangerous voltages or currents, light or the like. Examples of output devices of a user wearable device also include devices that output radio frequency signals, non-human audible sounds, light in a non-visible spectrum or the like. Combinations of output devices, such as tactile and scented outputs, are also envisioned.

The examples of systems and methods described herein provide information to visually impaired persons in order to facilitate navigation through a premises that a visually impaired person may move through either by walking or rolling in a wheelchair or similar device. The system examples include a lighting device equipped with a mapping sensor that generates information that is used to facilitate the visually impaired user's travel through the premises. Referring now to FIG. 1, which provides a block diagram of a number of elements of a system 35 of intelligent lighting devices 37 at one or more premises 39. Such a system 35 may also include separate standalone sensor units and will often include some number of network connected user interface elements, e.g. configured as wall controllers or the like. For convenience, such sensors and user interface components of the system 35 have been omitted.

The illustrated example of the system 35 includes a number of intelligent lighting devices 37, such as fixtures or lamps or other types of luminaires. The term "lighting device" as used herein is intended to encompass essentially any type of device that processes power to generate light, for example, for illumination of a space intended for use of or occupancy or observation, typically by a living organism that can take advantage of or be affected in some desired manner by the light emitted from the device. However, a lighting device 37 may provide light for use by automated equipment, such as sensors/monitors, robots, etc. that may occupy or observe the illuminated space, instead of or in addition to light provided for an organism. As another example, a lighting device may emit light in a manner intended to simultaneously provide useful illumination of a space and transmission of data.

A lighting device 37, for example, may take the form of a lamp, light fixture or other luminaire that incorporates a light source, where the source by itself contains no intelligence or communication capability (e.g. LEDs or the like, or lamp ("regular light bulbs") of any suitable type). In most examples, the lighting device(s) 37 illuminate a service area to a level useful for a human in or passing through the space, e.g. regular illumination of a room or corridor in a building or of an outdoor space such as a street, sidewalk, parking lot or performance venue.

The drawing shows a system 35 having a relatively high degree of intelligence implemented in the lighting devices themselves as well as networked communications amongst the lighting devices. Hence, in the example, each respective intelligent lighting device 37 includes a light source 43, as well as a communication interface 45, and a processor 47 coupled to control the light source 43 and to send and receive signals from a mapping sensor 44. In some examples, the lighting devices 37 are not equipped with a mapping sensor 44, but may have additional inputs and outputs (44S). The light sources 43 may be virtually any type of light source suitable to providing the intended type of light output that may be electronically controlled. The light source 43, for example, may provide visible or non-visible illumination or lighting or irradiation for other purposes (e.g. lighting for robot operation, UV cleansing, etc.); although for convenience, we may at later points in this discussion refer to the principal light output as providing visible illumination for human occupancy or the like. The light sources 43 may be of the same general type in all of the lighting devices 37, e.g. all formed by some number of light emitting diodes (LEDs); although in many installations, some numbers of the lighting devices 37 may have different types of light sources 43, e.g. some use organic light emitting diodes (OLEDs), LEDs, some use compact or tube type fluorescent sources, etc.

The processor 47 also is coupled to communicate via the communication interface 45 and the network link with one or more others of the intelligent lighting devices 37 and is configured to control operations of at least the respective lighting device 37. The processor 47 may be implemented via hardwired logic circuitry, but in the examples, the processor 47 is a programmable processor such as the central processing unit (CPU) of a microcontroller or a microprocessor. Hence, in the example of FIG. 1, each lighting device 37 also includes a memory 49, storing programming for execution by the processor 47 and data that is available to be processed or has been processed by the processor 47. The processors and memories in the lighting devices may be substantially the same in various lighting devices 37 throughout the premises, or different devices 37 may have different processors 47 and/or different amounts of memory 49, depending on differences in intended or expected processing needs.

In the examples, the intelligence (e.g. processor 47 and memory 49) and the communications interface(s) 45 are shown as integrated with the other elements of the lighting device or attached to the fixture or other element that incorporates the light source. However, for some installations, the light source may be attached in such a way that there is some separation between the fixture or other element that incorporates the electronic components that provide the intelligence and communication capabilities. For example, the communication component(s) and possibly the processor and memory may be elements of a separate device or component coupled and/or collocated with the light source 43.

In our example, the system 35 is installed at a premises 39. The system 35 also includes a data communication network 53 that interconnects the links to/from the communication interfaces 45 of the lighting devices 37, so as to provide data communications amongst the intelligent lighting devices 37. The data communication network 53 may support data communication by equipment at the premises 39 via wired (e.g. cable or fiber) media or via wireless (e.g. WiFi, Bluetooth, Zigbee, LiFi, IrDA, etc.) or combinations of wired and wireless technology. Such a data communication network 53 also is configured to provide data communications for at least some of the intelligent lighting devices 37 and possibly other equipment at the premises via a data network 55 outside the premises, shown by way of example as a wide area network (WAN), so as to allow devices 37 or other elements/equipment at the premises 39 to communicate with outside devices such as the server/host computer 57 and the user terminal device 59. The wider area network 55 outside the premises may be an intranet or the Internet, for example.

The lighting devices 37 are located to provide lighting service in various areas in or about the premises 39. Most of the examples discussed below focus on building installations for convenience, although the system 35 may be readily adapted to outdoor lighting. Hence, the example of system 35 provides lighting and possibly other services in a number of service areas in or associated with a building, such as various rooms, hallways, corridors or storage areas of a building and an outdoor area associated with a building. Any building at the premises 39, for example, may be an individual or multi-resident dwelling or may provide space for one or more enterprises and/or any combination of residential and enterprise facilities. For example, the premises 39 may be an office building with lighting devices 37 located in rooms within the office building, an area of a shopping mall, or may be an apartment building having a number of apartments that have lighting devices 37 located in the rooms of each apartment in the apartment building. The premises 39 is not limited to indoor spaces, but may also be outdoor spaces. For example, the lighting devices 37 may be located in stairwells of the apartment or office building. Alternatively, the lighting devices 37 may be located on a street corner light pole (a "street light") that illuminates a sidewalk or other area that pedestrians may travel through or may congregate. In general, the premises 39 may be any location or locations serviced for lighting and other purposes by a networked intelligent lighting system 35 of the type described herein.

A mapping sensor 44 is coupled to the processor 47 of the lighting device 37, and is configured to collect data that with appropriate processing allows for generation of a "map" of an area associated with the lighting device 37. The mapping sensor 44 is within the lighting device 37, and is a device that is capable of detecting boundaries of an area of premises 39 in which the lighting device is installed. In addition to detecting boundaries of the area of the premises 39, the mapping sensor 44 is capable of detecting objects within the premises. The mapping sensor 44 may be one or more sensors that facilitate the collection of data in an area associated with the lighting device 37. For example, the area associated with the lighting device 37 that is mapped by the mapping device 44 may correspond to coverage area of the lighting device 37 light source. The types of sensors that may be included in the mapping sensor include infra-red systems, light detection systems, radar-like systems, Lidar systems, ultrasonic systems and the like. Specific types of mapping sensors may include the Kinect™ from Microsoft™ either alone or in combination with computer applications, such as the Skanect™ Structure™ computer application. Examples of the different techniques the different sensors may use include, but are not limited to, a structured-light technique or a time of flight technique for determining the layout and/or structure of an area as well as determining the location of objects with the area. Another example of a mapping technique includes stereoscopic imaging which utilizes a pair of cameras to determine the layout, structure, and location of the area boundaries and objects within the area boundaries. Infrared systems may utilize near infrared (e.g., 1 micron wavelength) or long range infrared (e.g., thermal) imaging.

The mapping sensor 44 provides data collected from its sensors to the processor 47 of the lighting device 37. The processor 47 may execute mapping programming, such as the above-mentioned Skanect™ Structure™ computer application or the like, retrieved from memory 49 or from database 46 to process the collected data. For example, the processor 47 may process the data received from the lighting device 37 to provide mapping data of the area in which the lighting device 37 is located. In an example, the mapping sensor 44 of the lighting device 37 collects, using the above described mapping and imaging techniques, data regarding the area, such as objects 58 that may be located within a business office, a living room, a mall food court, or the like within the premises. In an example of an outdoor implementation, the objects 50 may be on a sidewalk such as a trash can, a fire hydrant, a kiosk, advertisement board, a curb, or the like.

In addition, the sensors of the mapping sensor may also obtain, or sense, conditions of an area, such as a number of persons (and their location within the area), temporary obstructions, such as a box or cart, animals, cars and the like. The sensed area condition information obtained via the sensors may be processed by the lighting device 37 or server 57. The sensed area condition information related to any sensed condition of the area, may include hazards, object locations, number of movable objects, including animals, persons, automobiles, pallets, temporary obstructions or robots in the area, and the like. The sensed area condition information may be delivered by the lighting device 37 via the wireless communication transceiver 45 to the user wearable device 11 or 61.

Since lighting devices 37 are typically installed at ceiling level of a room, the field of view of the mapping sensor 44, in some examples for structured light or time of flight systems, is downward toward the floor of the room with some lateral emission of sensor energy, for example, in a conical pattern, from the mapping sensor 44 to the floor of the area of the premises 44. In other examples, the sensor may use ambient light in the space, such as in a stereoscopic camera implementation of a mapping sensor. The emitted sensor energy is reflected by the objects 58 in the premises area in which the lighting device 37 is located, and the mapping sensor 44 receives some of the reflected energy. The mapping sensor 44 returns data (e.g., phase, power levels and the like) based on the received reflected energy to the processor 47. Some of the objects 58 may not be located directly beneath the mapping sensor 44, and as a result, the mapping sensor may only detect a portion or a lateral view of an object 58. If there are multiple lighting devices 37 in a room, and each has a mapping sensor 44, the data from each of the mapping sensors 44 provides a perspective view unique to that respective mapping sensor 44. The reflected energy data collected by the respective mapping sensors 44 may be shared with other lighting devices, or with a LEADER lighting device (e.g., selected as a leader according to known techniques of a group of lighting devices), in the room so a complete mapping of a room may be generated based on the data collected by the individual lighting devices. The complete mapping uses different processing techniques, such affine transformations and other perspective transformations, the processor 47, in each lighting device 37 or the LEADER lighting device, may generate a complete mapping of the area. The complete mapping may be a data representation of the view of the room (i.e., area)

based on a combination of mapping sensor data collected by each of the lighting devices located in the room.

Alternatively, each lighting device processor 47 may transmit, via communication interface 45, the collected mapping sensor 44 data set, either in real-time or in batch form, to the server 56. The server 56 processor(s) (not shown) may execute programming code that performs the room mapping based on the data received from one or more lighting devices 37 located in an area (i.e., room). Of course, the more sets of data received for a particular area, the more detailed the mapping data of the area will be. Examples of the processing, transformation and output of the processed data is described in more detail with reference to FIG. 2. The server 56 may access the data storage 46 to retrieve and store room mapping data. For example, the data storage 46 may store object coordinate data related to objects 58 in respective rooms of a premises. For example, object 58E may be a round table having a table top diameter of 3 feet and a height of 36 inches and be positioned (based on the center of the table top) 5 feet from a first wall and 6 feet from a second wall. The data may be stored in a database of the data storage 46 as an array of values (RM#, 3, 36, 5A, 6B, timestamp) or the like, where, for example, RM# is a number assigned to the building and room in which the table is located, 3 is the table diameter, 36 is the table height, 5A is the distance from boundary A, 6B is the distance from boundary B, and the timestamp indicates when the measurements were made. Similar, data arrays may be stored for objects 58A-D in the premises.

Using the prestored information regarding objects 58 in the room, the processor 47 may execute programming to generate data usable for mapping the room. For example, the processor 47 or the server 56 processors may generate a three dimensional (3D) object coordinates view based on prestored object location information and/or from the collected sets of mapping sensor 44 data. Using the 3D object coordinates, a transformation may be applied to the data that facilitates the transformation to 3D world coordinates. The 3D world coordinates may then be provided to a user wearable device, such as headgear 11. The headgear 11 processor may use 3D camera coordinates based on a view from camera 19 to perform a transformation that transforms the 3D world coordinate data into two dimensional (2D) image plane coordinates that may further be transformed into 2D pixel coordinates using, for example, interpolation, for presentation on a display to the visually-impaired wearer of the headgear 11.

The data storage 46 may store data for all areas or only specific parts of a premises, such as walkways or areas accessible to the public. The data storage 46 may also store data for a number of different premises. For example, data storage 46 may store room mapping data and related information for premises 39A that are provided and accessible via wide area network 55. This allows users to preplan trips to other premises, and also provides a set of training data for object recognition computer applications (described in more detail with reference to FIG. 2) that may be utilized by the processor 47 or server 56.

In some examples, a lighting devices include additional sensors/outputs such a microphone, a speaker, motion detectors, infrared detectors, such as thermal detectors, or the like.

The lighting devices 37, 38 as well as any other equipment of the system 35 or that uses the network 53 in the areas of the premises 39 may connect together using the network links and any other media forming the communication network 53. For network communication operations, the lighting devices 37 (and other system elements if any) for a given area are coupled together for network communication with each other through data communication media to form a portion of a physical data communication network. Similar elements in other service areas of the premises are coupled together for network communication with each other through data communication media to form one or more other portions of the physical data communication network at the premises 39. The communication interface 45 in each lighting device 37 in a particular service area will be of a physical type and configured to operate in a manner that is compatible with the physical media and electrical protocol(s) implemented for the particular service area and/or throughout the premises 39. Although the communication interfaces 45 are shown communicating to/from the network cloud 53 via lines, such as wired links or optical fibers; some or all of the interfaces 45 may use wireless communications media such as optical or radio frequency wireless communication. Also, although the examples in FIG. 1 show most of the lighting devices 37 having one communication interface, some or all of the lighting devices 37 may have two or more communications interfaces to enable data communications over different media with the network(s) and/or with other devices in the vicinity.

The various portions of the network in the premises areas in turn are coupled together to form a data communication network at the premises, for example to form a premises-wide local area network (LAN) or the like. The overall premises network, generally represented by the cloud 53 in the drawing, encompasses the data links to/from individual devices 37 and any networking interconnections within respective areas of the premises where the devices 37 are installed as well as the LAN or other premises-wide interconnection and associated switching or routing. In many installations, there may be one overall data communication network 53 at the premises 39. However, for larger premises and/or premises that may actually encompass somewhat separate physical locations, the premises-wide network 53 may actually be built of somewhat separate but interconnected physical networks represented by the dotted line clouds. The LAN or other data network forming the backbone of system network 53 at the premises 39 may be a data network installed for other data communications purposes of the occupants; or the LAN or other implementation of the network 53, may be a data network of a different type installed substantially for lighting system use and for use by only those other devices at the premises that are granted access by the lighting system elements (e.g. by the lighting devices 37).

Hence, there typically will be data communication links within a room or other area as well as data communication links from the lighting devices 37 in the various rooms or other areas out to wider network(s) forming the data communication network 53 or the like at the premises 39. Devices 37 within an area can communicate with each other, with devices 37 in different rooms or other areas, and in at least some cases, with equipment such as 57 and 59 outside the premises 39.

Various network links within an area, amongst devices in different areas and/or to wider portions of the network 53 may utilize any convenient data communication media, such as power line wiring, separate wiring such as coax or Ethernet cable, optical fiber, free-space optical, or radio frequency wireless (e.g. Bluetooth or WiFi); and a particular premises 39 may have an overall data network 53 that utilizes combinations of available networking technologies. Some or all of the network communication media may be used by or made available for communications of other gear, equipment or systems within the premises 39. For example, if combinations of WiFi and wired or fiber Ethernet are used for the lighting system communications, the WiFi and Ethernet may also support communications for various computer and/or user terminal devices that the occupant(s) may want to use in the premises. The data communications media may be installed at the time as part of installation of the lighting system 35 at the premises 39 or may already be present from an earlier data communication installation. Depending on the size of the network 53 and the number of devices and other equipment expected to use the network 53 over the service life of the network 53, the network 53 may also include one or more packet switches, routers, gateways, etc.

Of note for purposes of the discussion of the user wearable device 11 and other types of user wearable devices, the system 35 of intelligent lighting devices at the premises 39, particularly the network 53 of that system 35, can support wireless data communications with user wearable devices like the user wearable device 11. For example, the network 53 may include an appropriate wireless access point 54 compatible with the particular transceiver implemented in the user wearable device 11 and other types of user wearable devices that may operate at the premises 39.

An installed lighting device may provide the wireless network access for the user wearable device. For example, intelligent implementations of the lighting device include communications capabilities. Those capabilities include a network communication interface, for example, to access a broader area network outside the premises. Some lighting device implementations also include a wireless transceiver for use by other devices within the premises. In this latter example, the lighting device itself may provide access via the wireless transceiver for use by the user wearable device.

Hence, in the example of FIG. 1, in addition to a communication interface 45 for enabling a lighting device to communicate via the network 53, some of the devices 37 may include an additional communication interface, shown as a wireless interface 45W in one or more of the lighting devices 37. The additional interface allows other elements or equipment to access the communication capabilities of the system 35, for example, as an alternative user interface access or for access through the system 35 to the public WAN 55. Of note for purposes of the discussion of the user wearable device 11 and other types of user wearable devices, the wireless interface 45W compatible with the particular transceiver implemented in the user wearable device 11 and other types of user wearable devices that may operate at the premises 39 so as to provide additional or alternative access for user wearable devices to the data communications capabilities of the system 35.

Some of the devices 37 may include an additional sensor or input/output interface, shown as additional I/O 44S in one or more of the lighting devices 37. The additional I/O 44S may include a microphone for receiving voice commands, speakers for outputting directional audio commands, scent delivery devices, such as a misting device, an infrared light source or the like.

A host computer or server like 57 can be any suitable network-connected computer, tablet, mobile device or the like programmed to implement desired network-side functionalities. Such a device may have any appropriate data communication interface to link to the public WAN 55. Alternatively or in addition, a host computer or server similar to 59 may be operated at the premises 39 and utilize the same networking media that implements data network 53.

The user terminal equipment such as that shown at 59 may be implemented with any suitable processing device that can communicate and offer a suitable user interface. The terminal 59, for example, is shown as a desktop computer with a wired link into the public WAN 55. However, other terminal types, such as laptop computers, notebook computers, netbook computers, tablet computers, and smartphones may serve as the user terminal computers. Also, although shown as communicating via a wired link from the public WAN 55, such a user terminal device may also or alternatively use wireless or optical media; and such a device may be operated at the premises 39 and utilize the same networking media that implements data network 53.

The network will also include one or more types of wireless access points or base stations generally shown at 61. These access points could provide wireless communication service for user wearable devices such as the user wearable device 11. However, because of the low power operations of such devices, the devices such as the user wearable device 11 may not be able to communicate directly with wireless access points or base stations generally 61 on the public WAN 55. However, mobile devices such as smartphones 63 will be able to communicate with one or more types of base stations and wireless access points 61 on the public WAN 55. Such smartphones 63 and other mobile stations also may be able to communicate via the wireless access point 54 and/or wireless interface 45W in one or more of the lighting devices 37, so as to take advantage of the communications capabilities of the system 35 at the premises 39.

As outlined above, the wireless communications of the system 35 with the user wearable device 11 may use radio frequency communications, light communications or other technologies. Radio oriented approaches may utilize transceivers in the system 35 similar to radio-based access points in other types of networks, such as may provide wireless connectivity via WiFi, Bluetooth, etc. Light-based approaches (e.g. LiFi, IrDA, Lumicast™, Bytelight™, etc.) may use modulation of the light source or another source in the lighting device(s) 37 in combination with sensor(s) to detect modulated light from the headgear 11 or other wearable user interface at the premises 39. Hence, wireless light communications could use the illuminating light source 43 of any lighting device 37, another source in the device 37 (e.g. an additional emitter such as a LED designated for communication) or a source in a separate module (e.g. an add-on to the lighting device 37 or as a standalone system element coupled to the network 53). Conversely, wireless light communications could use a corresponding sensor in the same or a different lighting device or in an add-on or separate module.

For various reasons, the communications capabilities provided at the premises 39 may also support communications of the lighting system elements with user terminal devices and/or computers 59 within the premises 39. The user terminal devices and/or computers within the premises may use communications interfaces and communications protocols of any type(s) compatible with the on-premises networking technology of the system 35. Such communication with a user terminal, for example, may allow a person in one part of the premises 39 to communicate with a lighting device 37 in another area of the premises 39, to obtain data therefrom and/or to control lighting or other system operations in the other area. If the headgear 11 (or other user wearable device) uses lower power data communication technology, the wireless link may be relatively short. In such a case, the wireless link may be with another communication device such as a nearby lighting device 37 with a wireless transceiver or the smartphone 63 configured to act as a hotspot access point transceiver, where the other communication device itself has access to a data network 53 or 55. As in earlier discussions of wireless, the wireless communication for this latest purpose may use any suitable technology, e.g. using any appropriate radio frequency or light-based standards.

The external elements, represented generally by the server/host computer 57 and the user terminal device 59, which may communicate with the intelligent elements of the system 35 at the premises 39 and/or with the user wearable devices such as the user wearable device 11, may be used by various entities and/or for various purposes in relation to operation providing assistance to visually impaired persons in the vicinity of the lighting system 35 and/or to provide information or other services to users, e.g. via any of the user wearable device 11, or other wearable devices 61.

The lighting system 35 may have a number of different configurations that enable a visually impaired person to navigate through different areas of a premises including outdoor areas. In an example of a configuration, a lighting device 37 in the lighting system 35 provides data to a user device, such as one or more mobile devices 61, a smartphone 63 or a user wearable device 11. The lighting device 37 includes a processor 47, a wireless communication transceiver 45 usable with wireless interface 45W, a light source 43, a memory 49 and a mapping sensor 44 coupled to one another as shown in FIG. 1.

The processor 47 accesses programming stored in the memory 47 that when executed by the processor 47 configures the processor to control operations of the lighting device including the mapping sensor 44. The mapping sensor 44 is configured to collect mapping data using sensors described above with respect to other examples. The collected mapping data relates to the area of the premises in which the lighting device is located.

In this example, the lighting system 35 includes a data storage 46, accessible by the lighting device 37 processor 47, for maintaining area mapping data collected by the mapping sensor of an area in which the lighting device is located in the premises. The data storage 46 may also store processed mapping data and mapping information including navigational information or indications. Processed mapping data is area mapping data that has been processed using image processing techniques.

Figure 2:
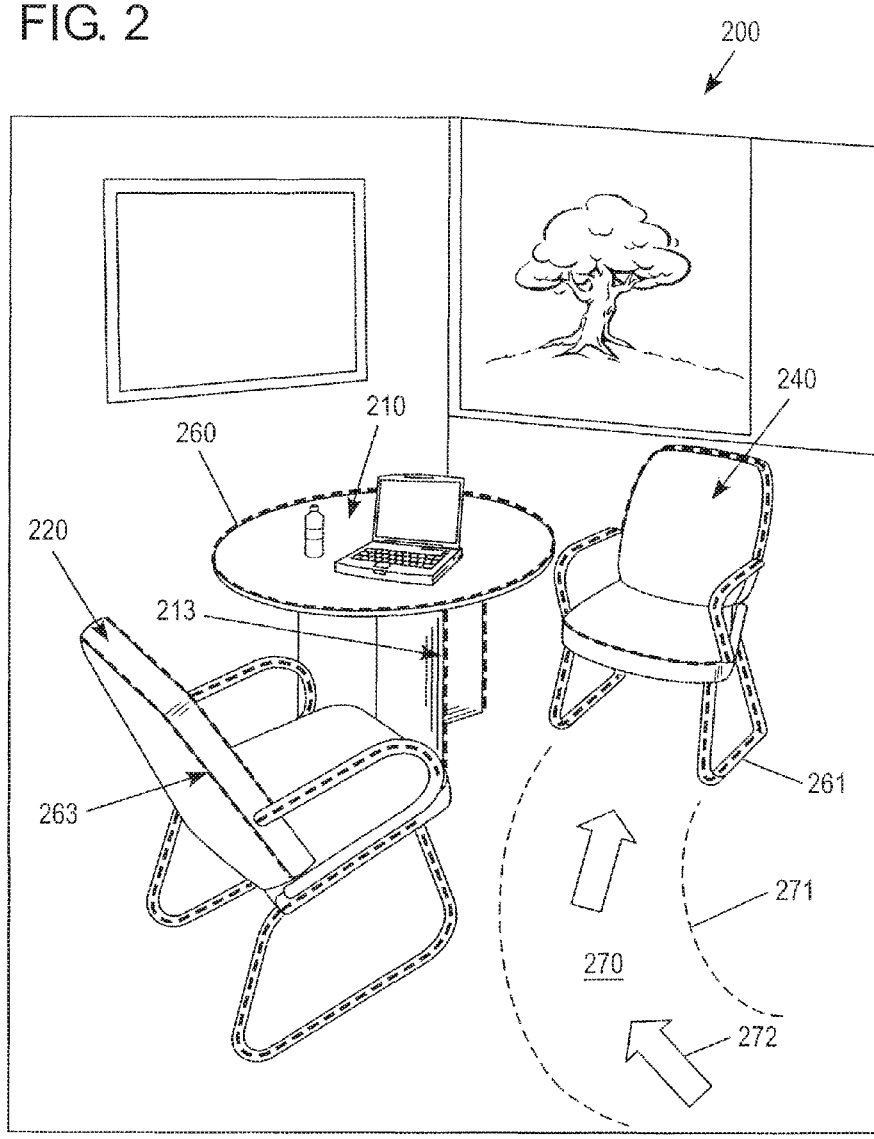
FIG. 2 depicts an example of a rendering of an area viewed from a perspective of a user wearing a user wearable device based on room mapping data obtained by at least one lighting device in the vicinity of the area.

When a user approaches an area, such as room 200 in FIG. 2, the lighting device via a communication interface 45, such as a wireless communication transceiver (e.g., WiFi, Bluetooth, VLC or the like) receives a request from a user wearable device or a mobile device for processed mapping data for the area of the premises in which the lighting device is located. The lighting device processor 47 in response to the request delivers processed mapping data for the area of the premises in which the lighting device is located to the user wearable device. The delivered processed mapping data is retrieved by the processor 47 from the data storage. The processed mapping data includes one or more of object identifications, object boundaries indications, or navigation instructions or navigation indicators.

The image processing may be performed by lighting device processor 47, the server 56, or the wide area network server 57. For example, the light device processor 47 may instruct the mapping sensor to collect mapping data of the area of the premises in which the lighting device 37 is located, and sends the collected mapping data to the server for image processing. Alternatively, after instructing the mapping sensor to collect mapping data of the area, the lighting device processor 47, upon execution of image processing programming, generates the processed mapping data by image processing the collected mapping data. The processed mapping data may be stored in the lighting device memory 49, or the data storage 46. Alternatively, the processed mapping data is stored in the lighting device memory 49 and a copy of the processed mapping data is stored in the data storage 46, or vice versa.

Many of the various examples discussed below relate to use of user wearable devices. In the illustrated examples, the user wearable device takes the form of headgear, such as eyeglasses or a hat or helmet, that provides a display (e.g. an augmented reality display) for a user/wearer, specifically adapted for use with a lighting system 35 as described herein. Although the user wearable device may use other form factors as noted earlier, since FIG. 1 shows the device by way of example as eyewear or the like, we will in many instances refer to examples below using the term headgear.

The user wearable device includes a framework configured to enable a user to wear the headgear. The device includes a number of elements attached to or housed in some manner within the framework. The device would also include a display or other type of output device, supported by the framework. A display, for example, would be viewable by at least one eye of the user when wearing the user wearable device. The device also includes a camera and/or other sensor supported by the framework. A wireless transceiver supports communications for the user wearable device.

In an example of a user wearable device where the device is intelligent, a processor controls device operations, and the user wearable device also includes memory and programming in the memory for execution by the processor. As discussed in more detail below, the programming configures the user wearable device for specific functions relating to a providing navigational information that includes navigational instructions or indications to the user while wearing the device, including for example, providing a user interface for lighting related operations of the device. The navigational information is generated based on mapping data either provided by devices located on objects in the area of the premises or by a mapping sensor(s) in one or more lighting devices located in the area of the premises.

Reference now is made in detail to the examples illustrated in the accompanying drawings and discussed below. FIG. 1 illustrates an example 11 of the user wearable device, in this example, headgear configures as a user interface device and in the form of eyeglasses or goggles. As used herein, the term "headgear" is meant to broadly encompass many types of head-wearable configurations, including for example, any item of eyewear, clothing or apparel or other accessory or the like that can be worn on a user's head, although as noted above, a "head-wearable" device may take some additional forms that may be worn on a user's head. Examples of headgear include eyewear, such as monocles, spectacles, eyeglasses, contact lenses and goggles; as well as hats, helmets, visors and the like, such as the Microsoft HoloLens™ and the Epson Moveria™. Where the description refers more broadly to user wearable device (without specific reference to headgear or head-wearable), the description encompasses other form factors that may be worn elsewhere on the body of the user, such as smart watches, smart bracelets, smart armbands, smart brooches or smartphones, smart "fanny packs," smart clothing, such as pants, shirts, vests, collars, or the like. Other examples include a smart shirt or vest with multiple points of vibration to indicate a directional/navigational information, such as vibration on the right to indicate a movement toward the right of the wearer.

The user wearable device, in another example, is configurable as a glove or pair of gloves that provide tactile information, such as Braille, Braille-like or other haptic inputs at the fingertips, palm or back of the hand of the gloves that are detectable by the visually impaired person. The gloves may be connected to a device, such as a mobile device, that includes, for example, a processor, a wireless communication transceiver, a memory, and suitable computer programming to receive mapping data including navigational instructions from a lighting device. The mobile device provides output signals, such as the navigational instructions and indications via either a wired or wireless connection, to the glove that the glove converts to the user detectable output. Alternatively, the gloves are configured with the processor, wireless communication transceiver and other circuitry to receive the mapping data including navigational information from the lighting device. The glove processor may ignore image-related mapping data and only process the navigational information. For example, the navigational information may be provided separately from the image-related mapping data or have a particular header that identifies the data as navigational data. As a result, the blind user is able to receive tactile navigational instructions. In addition, the information delivered by the lighting device to the user wearable device may be any information related to any sensed condition of the area, such as hazards, object locations, number of persons in the area and the like. The user wearable gloves are also beneficial to the hearing impaired user. Additional examples of user wearable devices, or items, may also include user sensory stimulation devices, such as, for example, devices that output vibrations, refreshable braille displays, such as an e-book or tablet, speech synthesizers, and the like.

The user wearable device, however, also may take other forms and therefore may incorporate still other types of framework. Another headgear type of the form factor, for example, is a helmet or a hood. Or, other examples are also envisioned such as mouth guard-like devices that are inserted in the user's mouth. Directional/navigational information may be presented in a manner that stimulates the user's tongue to provide directional/navigational information, such as an example of indication to stop moving being a series of sharp pulses or to move left being a signal on the left side of the tongue. Other examples may include audio examples that use sound to generate a scene in the user's brain. The audio examples may also include ultrasonic systems that facilitate the generation of directed audio. For example, a visually impaired user may or may not have a user wearable device or other mobile device, and not necessarily the headgear 11 of FIG. 1, that indicates to one or more lighting devices a location in the premises of the user device. Based on the location of the user device, input/output (I/O) devices 44S, such as speakers configured to generate ultrasonic sounds using known ultrasonic sound generation equipment, positioned with a lighting device 37 in the vicinity of the user device may output an ultrasonic audio signal that is directed to a narrow space specifically in the direction of the user device. In other words, opposite the concept of a loud speaker or a megaphone, the ultrasonic capable speakers are configured to generate directed sound such that only persons in close proximity of the user device may hear the generated audio signal. As a result, specific audio commands such as "enter the room by moving straight," or "turn left" may be provided without broadcasting the commands to the entire room or disrupting conversations of other persons in the area. Similar configurations may be used in an outdoor implementation of a lighting device that is configured to generate ultrasonic messages that notify or warn users, including the visually impaired users, of crossing signals, sidewalk hazards, turns in a sidewalk, or the like.

In the example of a user wearable device being goggles or some form of eyewear, the user wearable device 11 includes one or more sensors or inputs usable to detect and/or communicate with a lighting device or system of lighting devices. Returning to the illustrated eyewear, by way of an example, the headgear 11 includes a camera 19. In the example, the camera 19 is mounted on the centerpiece 15 between the lenses 14L and 14R. Other positions and mounting arrangements may be used for the camera 19. The camera 19 in the example is of a type the same as or similar to cameras used in smartphones and other portable/mobile devices, and the camera 19 is capable of capturing still images and video. Such an example utilizes a camera that is sensitive to at least a substantial range of the visible spectrum. However, other types of imaging technologies that may be used to form the camera may instead or in addition be sensitive to energy in other regions of the spectrum, e.g. infrared (short range and/or long range), ultraviolet or radio frequency.

Also, although the examples show one camera 19 in the user wearable device 11, such a device may include one or more additional cameras. The camera 19 is shown directed along the wearer's field of view, and an additional camera may have a generally parallel field of view (e.g. as if one camera is associated with each of the wearer's two eyes (i.e., stereoscopic)). The camera 19 or an additional camera, however, may have a different orientation, with a field of view in another direction, e.g. straight up, or up or down at an angle with respect to eye field of view.

The user wearable device 11, when in the form of eyewear includes a display supported by the framework so as to be viewable by at least one eye of the user when wearing the headgear. As discussed more later, output to a user wearing the user wearable device 11 may take other forms, e.g. audio and/or tactile output (described in other examples), either instead of or in addition to a display output. A variety of display technologies may be used to present information to the eye of the user, on or through the lens or in other ways if the lenses are omitted. In the example, however, one or both of the lenses 14L and 14R serve as the display (as well as allowing light to pass through to the eye(s) of the wearer of the user wearable device). For such an implementation, each lens element 14L or 14R intended to serve as a display may be formed of or coated with material(s) to display data (e.g. text and/or still or video images). The lenses may be translucent while still retaining sufficient transparency to allow the wearer to see and observe objects through the respective lens. Conversely, the lenses may be opaque, and the display presents the camera image in real time (to appear as if seen through a lens) with a presentation of processed room mapping data as an overlay on the real-time image. In an example, the display covers the primary lines of sight or field of view of at least one of the user's eyes into a room or a specifically defined space, such as a sidewalk, walk way into or around a facility, such as a subway station or train station, and additional information (e.g., navigation direction indications, hazard indications, room modification, and the like) is added to the displayed room image to enhance the presented room scene. The overlaid information may be in the form of enhancement of features shown in the display, such as enhanced edges of objects or highlighting (including colored highlighting) of user navigable pathways within a room, and the like. For example, the color Red may indicate obstructed path or trip hazard, the color Yellow may indicate caution (e.g., narrow path) and the color Green may indicate an Unobstructed path. The overlaid information will be described in more detail with reference to other examples and figures, such as FIG. 2. Other configurations, however, may provide the information display at a somewhat more peripheral position, e.g. located slightly outside the user's primary line(s) of sight/field(s) of view (such as arrows indicating a direction of travel or movement.

Other technologies may be used to provide the "heads-up" display, some of which do not require a lens or the like one which to generate or project the displayed information content. Displaying information configures the headgear 11 to provide a heads-up display feature for example in the form of an augmented reality display in which information is superimposed over a computer generated room scene. Other technologies may be used to provide the heads-up display, some of which do not require a lens or the like one which to generate or project the displayed information content.

Processing of information may be done in the user wearable device 11 and/or in other data processors that communicate with the device 11. Of course, the information processing (including image processing) may also be done in the cloud, so to speak. In such a case, the device 11 may include only sufficient circuitry to process received information so as to output the information to the wearer, e.g. to display received data like on a monitor. Alternatively, the user wearable device 11 may be a relatively intelligent device with significant internal processing capability.

As discussed more later with respect to the block diagram of the headgear 11 in FIG. 2, the headgear example of the interface device also includes a wireless communication transceiver, a processor, a memory and programming in the memory. The processor and memory are supported by the framework of the user wearable device 11. In the example, the processor and memory would be part of the electronics 21. Although the electronics may be mounted in various other ways and/or at other positions on the headgear 11, in the example, the electronics 21 are located on the left side panel 19L. In the example, the wireless transceiver is included on or in the framework of the headgear 11, e.g. as a further element of the electronics 21 on the panel 19L. Depending on size constraints of the form factor and/or power requirements, however, the transceiver could be carried or worn elsewhere on the body of the user and connected to the processor in the user wearable device 11.

The user wearable device 11 may include a user input device or mechanism supported by the framework, e.g. in the form of a hardware sensor and/or logic to sense a condition via the hardware sensor or via the sensor that detects the lighting equipment (e.g. via the camera). The user input in the example is a touchpad 23 or other type of touch sensor shown at in FIG. 1. A touchpad 23, for example, may be a capacitive or other type of touch sensor similar to but typically smaller in size than touchpads commonly used today on user terminal type computer devices. Although the touchpad 23 may be mounted in various other ways and/or at other positions on the headgear 11, in the example, the touchpad 23 is located on the right side panel 19R. In that location, the touchpad 23 has a touch surface exposed for touching by one or more fingers of the wearer's right hand. For left hand operation, a similar touchpad could be provided on the left side panel 19L, instead of or in addition to the touch pad on the right side panel 19R. The user input could also be gestural through camera(s) (e.g. to detect hand movements, eye movements), through buttons on the framework, through rapid positional movements of the wearer's head using an accelerometer and/or gyro (e.g. flick head up rapidly), brain computer interfaces, etc. Another approach might use voice input and speech recognition to detect user inputs.

The user wearable device processor in electronics 21 is coupled to the display 14L and/or 14R, the camera 19, the transceiver and the input, the processor being configured to control operations of the headgear and has access to the programming in the memory.

FIG. 2 depicts an example of a rendering of an area from a perspective of a user wearing a user wearable device based on room mapping data obtained by at least one lighting device in the vicinity of the area. The displayed example of room mapping data includes navigational instructions or indications overlaying either a mapping of the room or a view of the room from the perspective of a user wearing the user wearable device. For example, the headgear 11 may be configured to provide a heads-up display feature for example in the form of an augmented reality display in which the navigational instructions or indications are superimposed over a computer generated scene of the area. Alternatively, the navigational instructions or indications are superimposed over an actual scene of the area that is viewed either through transparent lenses of the headgear 11 or over a real-time video view of the room captured by camera 19 of the headgear 11. In either instance, the navigational instructions and indications that are presented to assist the visually impaired user to navigate the area are presented in manner (e.g., at high intensity, in specific color or the like) so that the visually impaired user may see them despite the visual impairment, or otherwise, be made aware of the navigational instructions or indications.

The view of room 200 in this example is an office, but similar views may be presented for a bedroom, dining room, food court, retail store, sidewalk or the like. A system including a lighting device 37 and a user wearable device 11. In the above described examples, is capable of generating the scene shown in FIG. 2. As described above, the mapping sensor 44 and processor 47 of a lighting device 37 located in a room of the premises 39 are configured to determine the location of objects 58 in the room by applying image processing techniques to mapping data collected by the mapping sensor 44 to generate processed mapping data by execution of image processing computer applications that apply image processing techniques to the collected mapping data. In another example, the collected mapping data may be forwarded to a server, such as server 56 or 57 for generation of processed mapping data by executing similar image processing computer applications as the lighting device processor 47. In the example of FIG. 2, the objects 58 in the view of room 200 are the table 210 and the chairs 220 and 240. The mapping sensor 44 of the one or more lighting devices 37 located in the room 200 provides mapping data that may be processed to provide details of objects in the room 200 such as the base 213 of the table 210 and chair legs 215, so that a view of the room 200 may be generated from any perspective of a user. For example, the mapping sensor 44 collects mapping data which is processed by either processor 47 or by server 56. The processed mapping data, which will be discussed in more detail below, for example, includes data representing enhanced edges of objects, indications of unobstructed pathways, and the like.

To better assist a visually impaired user to navigate through the room 200, the images presented on the display of the above-described headgear 11 may be enhanced. For example, the edges of objects, such as the table 210 and chairs 220 and 240 may be enhanced using known edge enhancement image processing techniques.

For example, in the room 200, there may be four lighting devices similar to lighting device 37 described above with respect to FIG. 1, each of the four lighting devices may have mapping sensors that obtain mapping data of the room 200 from their own perspectives. One of the four lighting devices may be designated a LEADER device and the other lighting devices may be designated as FOLLOWER devices. The LEADER device and the FOLLOWER devices may selected according to known ad hoc networking protocols or similar types of networking protocol techniques. The FOLLOWER devices may forward the mapping data collected by their mapping sensors to the LEADER device. The LEADER device may process the received mapping data with the mapping data collected by its own mapping sensor to provide a set mapping data specific to room 200. The LEADER device processor may store the set of room 200 mapping data in the LEADER lighting device memory. In addition or alternatively, the set of room 200 mapping data may be sent to a data storage, such as data storage 46 or to server 56 for image processing. The stored set of mapping data may be available to other user's wearable devices or other computing devices, such as smartphones 63, laptops, external devices, such as computer 59, and the like, via a connection to network 53 or through a connection with another lighting device. For example, the user wearable device may determine a direction of travel of the user, and further determine based on the determined direction of travel that the user is leaving a room adjacent to room 200 and heading toward room 200. As a result, the user device may request via a network connection the set of mapping data for room 200 stored in either the data storage 46 or in the memory of the LEADER lighting device 37 located in room 200.

Earlier in the discussion of the image processing performed by a processor using the mapping data, it was mentioned that an edge detection enhancement algorithm may be applied to the room mapping data to enable the enhancement of object edges 260, 261 and 263 in the display of the room 200 on the display devices of a user headgear 11. For example, the image processing applied to the collected mapping data may include edge detection. The processed mapping data may include data identifying detected edges including edge enhancements based on colors or increased intensity/luminance/brightness levels as well as computer-generated graphic navigational indications, such as dashed lines, arrows or the like, that are overlaid over a view of the area. Based on the processed mapping data, a processor managing the display device on which the processed mapping data is to be presented shows the enhanced edges and/or navigational indications as particular colors and/or with a specific intensity/luminance/brightness level that corresponds to the navigation instruction or object. For example, tables may always be presented in the color blue surrounding the top of the table, while unobstructed pathways are presented as green, or the like.

The presentation of different colors may not be helpful to all visually-impaired users. For example, a color blind user may not be able to differentiate between the green and red colors. Instead of presenting green for unobstructed pathways, shapes, such as triangles or circles may be used. The processor of either the user wearable device 11 or the processor 47 may alter the mapping data so that instead of colors be rendered on a display the different colors may be presented as shapes to inform the color blind person of the navigational instructions and indicators.

However, in other examples, instead of edge enhancement, the edges of the table 210 may have a reflective tape or coating applied to the arms and legs of chairs, the edges and legs of tables, and the like, so that the enhancement of the edges 260, 261 and 263 is due mainly to the visual information captured by a camera and/or some image processing enhancement techniques, and not solely to the application of only image processing techniques. The reflective tape or coating may respond to modulated light output by the light source 43 of the lighting device 37 shown in FIG. 1. In a specific example, the lighting device 37 may modulate signals to the light source 43 at a modulation rate that is not discernible by the human vision system. The modulated light may interact with the reflective edge coating or tape on the edges of the table 210 and chairs 220, 240 to produce reflected light signals at the modulation rate of the light source 43. The reflected lighting signals may also not be discernible to the human vision system. As a result, the camera 19 on the user headgear 11 or in another user wearable device, or smartphone may detect the reflected light signals and produce (after image processing of the mapping data) video images showing the flashing, or modulated light. In addition, the modulation rate may be selected such that the modulated light does not cause unwanted effects with the image collection by the headset 11 camera 19 or any other device used by a user of the system or by the mapping sensor 44. For example, the camera 19 detects the modulated reflections (i.e., flashes) from the reflective tape at the edges 260, 261 and 263 of the table 210 and respective chairs 220 and 240. The flashing edges are presented on the display of the headgear 11, so the wearer of the headgear 11 may identify the edges 260, 261, 263 of the objects 210, 220 and 240 in the room 200.

The flashing reflective tape may also be of different colors to indicate different aspects of the room 200 to the user. For example, not only may the edges 260, 261 and 263 have flashing reflective tape, but the floors may have different coatings or taped areas that respond to the modulated light. The object edges 260, 261 and 263 may be red in color, while unobstructed pathways on the floor may be presented as the color green. Or, the floors may have different carpeting or tiles that create images having highlighted edges in the floor as a result of edge enhancements to the captured images of floor tiles or carpeting. These floor tiles or carpeting may also be color coded. As a result, using either the reflective tape or an another method of indicating a pathway on the floor, the processor via image processing is configured to identify a pathway in the room.

In another example, lighting device receives a command that causes the modulation of the light source in a manner that causes the reflective tape or coating flash in a manner that is visible to all persons, both the visually impaired and the non-visually impaired users. The flashing reflective tape or coating allows the visually impaired person to navigate through the room in which the lighting device is installed.

In yet another example, the objects in the room may have devices (such as, for example, radio frequency identification (RFID) devices) attached to the respective objects. For example, the table 210 and chairs 220 and 240 of FIG. 2 may have RFID tags that are detectable by additional I/O 44S of a lighting device 37. Other objects may also include electronics (e.g., RFID, Bluetooth low energy, WiFi or the like) that are configured to inform the lighting devices 37 of the location of the objects within the room 200. In such an example, the lighting device only needs to detect the electronic devices, which may have been pre-programmed with a location (e.g., the room is broken up into a grid, and a database is maintained of the occupied grids for each room in a premises, or a room layout is maintained in a database, which uses the signals from the objects to confirm the object location), and the data received from the electronic device may indicate position, configuration of the object (e.g., an L-shaped table or a rectangular desk of length X and width Y, and so on), dimensions of the object associated with the electronic device. Alternatively or in addition, the objects may determine their location in the room using, for example, a location service offered by the lighting system (examples of lighting system based location services include Lumicast™ or ByteLight™). A database of objects and the object locations may be maintained in the data storage 46 or a data storage associated with server 57. A benefit of these examples is that the lighting device 37 does not need to map the particular object or the room, so the lighting device 37 only needs to be able to communicate the location of the objects in the room to a visually-impaired user's user device. The communication to the user device may be performed via a connection between a lighting device 37 wireless transceiver 45 and a user device, such as 11, 63 or 61.

The above described room scene enhancements may be combined with the set of room mapping data so that a visually impaired person may be presented with a scene of the room 200 on the display of headgear 11 that is augmented with navigational indicators. In an example, a visually impaired person wearing headgear 11 is presented with a display of an image of the room 200 as shown in FIG. 2 based on processing room mapping data. The room 200 is presented with the edges 260, 261 and 263 enhanced. In addition, an unobstructed pathway 270 may indicated by edge markings 271, which may be overlaid on the scene of the room 200 based on information obtained from the processed mapping data. For example, object recognition algorithms may be applied to the set of mapping data to identify objects in the rooms in which the lighting devices are located. The object recognition algorithm may be developed using stored information regarding the furniture used to furnish the premises, such as dimensions or other characteristics of the tables, chairs, appliances, computers and the like. Known object recognition algorithms and techniques may be used. When either processor 47 or server 56 performs the image processing unobstructed pathway 270 between objects in the room may be determined. For example, when object recognition processes do not detect an object within a certain distance (e.g., 12 inches, or based on a user parameter, such as a mode of travel, such as a wheelchair (wide path), walker assisted (wider path) and walking without a walking aid (widest path)) a section of the image may be labeled "unobstructed." As the mapping data is processed, other areas may be determined to be unobstructed. Adjacent unobstructed areas may be combined to form unobstructed pathways that may be presented as unobstructed pathways 270 on a display device of headgear 11.

In a specific example, the room 200 of FIG. 2 is illuminated with lighting devices, such as lighting devices 37 as described in FIG. 1. Room 200 as mentioned above in a previous example, may have multiple lighting devices located in the room, such as in the ceiling. The mapping sensors of each lighting device may collect mapping data that may be combined to form a set of mapping data for the room 200. In the example, a visually impaired user wearing the headgear 11 and carrying a smart device, such as smartphone 63, is traveling through the premises, such as premises 39, in which the lighting devices 37 are located. Lighting devices, other than those located in room 200, may be providing information to the headgear 11. For example, the other lighting devices also facilitate tracking of the user as the user travels through the premises using either visible light communication techniques or systems, such as Lumincast™ and Bytelight™, Wi-Fi or Bluetooth signals and a trilateration computer application that facilitates the determination of the user's smartphone 63 being carried by the user in the premises. Using this information, a processor, such as processor 47 or the processor of server 56, or even the processor of server 57, or combination of processors, may provide room information to the user devices, such as the headgear 11 or the smartphone 63, as the user nears a specific room. For example, when the user is within a short distance of an entryway to room 200, the processor may cause the download of room mapping information to the headgear 11 processor. Using visible light communication between the other lighting devices and the smartphone 63, the processor of server 56 may determine that the user is traveling into room 200. For example, the smartphone 63 may execute a computer application that interacts with the other lighting devices utilizing either Lumicast™ or Bytelight™ technology may provide the user location information for identifying the room in which the user may be traveling into or near. When it is determined that the user is traveling into room 200, the processor of server 56 may access data storage 46, obtain the set of room mapping data for room 200 and deliver the set of room mapping data to the headgear 11 processor.

While the user is entering room 200, the headgear camera 19, for example, is collecting an image of room 200. Using the collecting image data from the camera 19, the headgear 11 processor determines the user perspective of room 200. In other words, if the visually impaired user is six feet tall, the headgear 11 processor may determine that the view of room should be viewed from a particular viewing angle associated with a person wearing the headgear 11 that is six feet tall, for example. For example, the headgear 11 processor may determine camera view coordinates or world view coordinates discussed previously used by the image processing computer application of the server 56 processor. Alternatively, the headgear 11 may provide the camera data to the server 56 processor for determination of the user perspective of room 200.

Upon determining the user perspective of room 200, the headgear 11 processor may be provided with a transformed set of room mapping data that has been transformed based on the previously determined user perspective of room 200. The transformed set of room mapping data may be used by the headgear 11 processor for presentation to the user via the headgear 11 display. The headgear 11 processor, for example, presents the room scene shown in FIG. 2 on the headgear 11 display. The room scene may include navigational indications or instructions such as pathway 270 that has directional arrows 270 and pathway boundary indicators 271. The pathway 270 is an unobstructed path along which the visually impaired user may travel. The width of the pathway 270 may be determined based on the user's mode of travel, which may be by walking, using a wheelchair, or a walker. As the user travels into the room 200, the directional arrow 272 may follow the user into the room 200. Similarly, the pathway 270 and pathway boundary indicators 271 may change as the user travels further into the room 200. In addition, as the user turns their head to look at different areas of the room 200, the pathway 270, pathway boundary indicators 271 and the directional arrow 272 may also change to indicate an unobstructed path in the direction that the user is looking.

In another example, the lighting device in the room 200 may determine that the user is present, and establish a wireless communication link with the user wearable device and/or the other user device. The user wearable device, either the headgear 11, or another user device, such as smartphone 63, may generate and send a request for processed mapping data for the area of the premises in which the lighting device, or lighting devices, are located, i.e., room 200. In response to the above mentioned request for processed mapping data for the area of the premises in which the lighting device is located mentioned above from a user device, the lighting device 37 processor in the room 200 retrieves the processed mapping data including indicators of objects, object boundaries and unobstructed pathways within the area from a memory, such as memory 49 or data storage 46. The lighting device 37 processor; delivers processed mapping data including identified objects, object boundaries and navigation instructions and indicators to the headgear processor 11. The processed mapping data may be retrieved from a memory of the lighting device or from a data storage or the like.

As discussed briefly above, the data storage 46 may store room-related or areas related information, such as object coordinates in one or more of the coordinate systems discussed above. Room-related information may be any type of information useful for identifying the room location within the premises, the arrangement of furniture and/or objects within a room. For example, room information may be information that, for example in a business office environment, identifies the location of desks, chairs, filing cabinets and the like, but also may identify the location of a computer keyboard, a desk telephone, pen containers, computer, computer monitor, lamps and other items common to the business office environment. Other examples of this type of information may become apparent from the detailed description of lighting device area mapping operations described below.

Examples of consumer devices that may serve as the wearable user wearable device 11, having combinations of various capabilities like those outlined above, which are now or likely will soon be available on the market, include Microsoft HoloLens™ and Epson Moverio™.

In addition to the elements discussed above, the user wearable device may include one or more other sensors. Two such additional sensors 25 and 27 are shown by way of example in the drawing.

Although the sensor 27 may be mounted in various other ways and/or at other positions on the headgear 11, in the example, the sensor 27 is located on the edge of the left lens 14L. If provided, the additional light sensor 27 may be a quadrant hemispherical detector (QHD), a light intensity sensor, and/or a color characteristic sensor, etc. A QHD, for example, provides light intensity sensing with respect to four quadrants and supports signal processing to determine the direction of light input. When used in the user wearable device 11, directional light sensing allows the device to detect a relative direction of the light fixture or luminaire with respect to the orientation of the headgear and thus relative to the orientation of the user's gaze. Several of these types of additional light sensors 27 also support detection of modulation of the light input. Detection of light modulation, for example, may enable the user wearable device to detect lighting device identification signals, receive location information related to the location of the lighting device, the user wearable device is able to use the location information received via the visible light communication to determine a location of the user relative to the lighting device.

When appropriately configured for lighting uses, a user wearable device like the user wearable device 11 in the example of FIG. 1 presents a wide range of applications in the context of lighting. It may be helpful to consider a number of methodologies for potential applications with respect to assisting visually impaired persons with navigation assistance. The examples may be applied to the headgear 11 or in the context of other types of user wearable devices, such as a smart phone, tablet, laptop, netbook, e-reader, smart watch, smart brooch, etc. The following discussions therefore will refer to the user wearable device, with the understanding that an example of such a device is the headgear 11.

As another application/method example, the user wearable device can be adapted to display room related images, such as location or mapping information. The lighting devices 37 somehow identify themselves to the user wearable device. This could be done through some type of light communication channel, for example, by modulating the output of each light source 43 with a unique identifier (e.g. visible light communication, ByteLight™, LiFi, etc.). Upon receiving the unique identifiers of the lighting device, the headgear 11 may request via a wireless communication with the identified lighting device, room mapping data specific to the identified lighting device from a server or processor that has access to the specific room mapping data.

As the user looks around the space, the camera (and/or other types of sensors) would map the space (e.g. room) and uniquely identify each lighting device in the space. The algorithm would deduce relative positions between key features (e.g. between the various fixtures, windows, wall corners, vegetation, furniture, etc.). In cases where there is mapping data stored in a central server, the software can then match each lighting device with its most probable match mapping data of the respective room.

In cases where each lighting device transmits a unique identifier and other information that can be detected by the user wearable device, and where the position of each lighting device is known, then the user wearable device or other device communicatively coupled to the user wearable can accurately calculate its position (or location) in a premises as well as its orientation within a surrounding area of the calculated position. The identifiers and/or other information may be communicated via, for example, visible light communication (e.g. lighting device modulates output and user wearable device detects using the camera (e.g. Lumicast™ or ByteLight™)). With such a system, the lighting devices 37 of the system 35 form a fixed constellation of emitters at known positions (or locations) and orientations. This position and orientation information may be used to enable determination of the location of a user wearable interface device (by the user wearable device itself or by another processing component processing identifiers captured by the user wearable device). With such location information, for example, the user wearable device could indicate to the user a clear travel path or the location of objects within the surrounding area of the user within the premises.

In outdoor applications, the high accuracy positioning information from above can be combined with high resolution maps in the user wearable device or in the lighting system (e.g. in one or more of the lighting devices). This data can be presented to users (e.g. disabled users), through the user wearable device so the user knows very precisely where they are in the outdoor space. Other sensor/environment data (e.g. traffic control signals, time of day, weather, etc.) can be collected by the lighting system, and then communicated to the user wearable devices of disabled "pedestrians" (e.g., visually impairs or totally blind) so they can navigate the space more safely and easily (e.g. cross the street when safe and/or legal). This pedestrian data can also be communicated, through the lighting system, back to the traffic control systems so traffic patterns can be modified as appropriate.

Another use case example involves the user wearable device obtaining object location information as the user walks by a lighting device 37. In this example, the user wearable device gets 6D positional data (position+angle=6 degrees of freedom) through its camera by its view of a constellation of lighting devices 37. Based on location and orientation of the user wearable device, the lighting system would know the direction in which the user is facing and therefore what they are likely looking at. Using this information, the lighting system having anticipated the possibility of the user facing in this direction or traveling in this direction can transmit related information (e.g. about objects in the vicinity of the user) by communicating location to a server 57 and receiving object location information and user alert warnings for presentation to the wearer of the user wearable device.

As another example, exit signs and possibly other devices 37 of the lighting system 35 can collect, analyze and communicate building status information (e.g. from fire/smoke detectors, power faults, ambient temperature readings (e.g. thermostats, ambient temp sensors in lighting devices), etc.), to occupants through the user wearable devices. For example, when an exit or exit path is blocked, the lighting system 35 may detect this through elevated smoke levels and temperatures in a certain section of the building. It can then send that information to the user wearable devices of nearby occupants so the user wearable device can present or indicate alternate egress routes to the user. If the lighting system 35 has enough information to determine a "best" egress route, that route can be communicated to the user wearable device. This new path can be presented by the device to the wearer as a visual display on a display device of the user wearable device, as an acoustic signal or the like. Although the example presented is where the lighting system can provide directions in emergencies, it should be apparent that this system could be used to, in non-emergency situations, guide visually impaired persons in buildings to their desired destinations as described in other examples.

As another example, a lighting system 35 could track user wearable devices, to track where people are within the premises 29. Such a system configuration could then offer a variety of location related information to the device users. For example, the system could help people within the premises 29 find restrooms, cafeterias, water fountains, meeting rooms and the like.

It is envisioned that different configurations of lighting devices 37 may be located in different spaces. For example, each area of a premises may include a lighting device 37 equipped with a mapping sensor 44, and another lighting device 37 includes the additional I/O, but not the mapping sensor 44. In another example, a lighting device 37 that may be provided that is configured to provide the functions and visually impaired user services, but does not include a mapping sensor 44. The lighting device 37 of this example may be located in an area of a premises 39. The additional I/O 44S and/or mapping sensor 44 may include one or more types of cameras, such as an optical camera, a thermal (long range infrared) camera a (short range) infrared camera, and interferometrics camera, a time of flight camera; ultrasonic based device or the like. The lighting device 37 processor 47 may respond to inputs received via the additional I/O 44S, such as microphone or other form of input, to a request from a user device, such as wearable device 11, smartphone 63 or other user wearable devices 61, such as a smartwatch, in the area. The request may be to retrieve mapping data of the area. Once the mapping data is retrieved by the processor 47, the processor may deliver the mapping data to the user device via the wireless communication transceiver, such as via visible light communication, Bluetooth, WiFi or the like. The processor 47 may update mapping data of the area with locations of objects in the area based on user inputs received, via the additional I/O 44S, indicating an object location in the area. For example, the smartphone 63 may be configured to operate using to Lumicast™ or Bytelight™, and the visually impaired user may speak the location of a known object using a phrase known to voice recognition software executing on the processor 47 of the lighting device. For example, the visually impaired user may say, "water bottle is here" or other phrase that signals the placement of the object. The lighting device 37 processor 47 receives, via the microphone 44S, and by execution of speech recognition software recognizes spoken mapping commands that identify the location of objects within the area. The user's smartphone 63 or other device using Lumicast™, Bytelight™ or similar technology, indicates the location of the visually impaired user when the signaling phrase is spoken to the lighting device 37. For example, a visually impaired user, such as a blind person, performs rough initial mapping of the area, but verbally pointing out the location of objects in the area. In this way, the visually impaired user can self-map the area as they use objects or obtain additional objects. Using voice commands, the visually impaired person can update the mapping data for the area over time. A benefit of this configuration is that the more often a visually impaired person uses objects and moves around the area, the more detailed the map becomes.

The lighting device processor 47 is configured to update the mapping data based on the user input and the location indicated by the user's smartphone 63 or mobile device. Subsequently, when a visually impaired user needs the water bottle, the visually impaired user speaks a query (e.g., "where is my water bottle"). In response to the visually impaired user's query, the lighting device may generate an indication of an object location based on the updated mapping data.

The lighting device 37, in other examples, generates an indication that is at least one of a visible light communication signal receivable by a user device in communication with the lighting device within the area, a non-visible light communication signal receivable by a user device in communication with the lighting device within the area, a radio frequency signal receivable by a user device in communication with the lighting device within the area, or an audio signal.

It may be helpful at this point to consider an example of the electronics of a user wearable device, in somewhat more detail. For that purpose, FIG. 3 includes a high-level functional block diagram of a user wearable device, in this example, of the user wearable device 11, configured to provide a user wearable device for room navigational-related purposes.

As discussed earlier, the example of the user wearable device 11 includes a display supported by the framework so as to be viewable by at least one eye of the user when wearing the headgear 11. The display is shown generically at 71 in FIG. 3, since it may be implemented using a variety of technologies capable to providing an augmented reality display to the user wearing the headgear 11. In the example of FIG. 1, one or both of the lenses 14L and 14R also form(s) the display corresponding to 71 in the block diagram circuit example of FIG. 2.

The user wearable device 11 includes a display driver 73 for providing signals to operate the display 71 so as to present information to the user while wearing the headgear 11. The particular type of driver corresponds to the type of technology used to implement the display 71. The driver 73 thus controls information output via the display 71, in response to instructions and data from other elements of the device 11, e.g. from the processor shown at 75.

Figure 3:
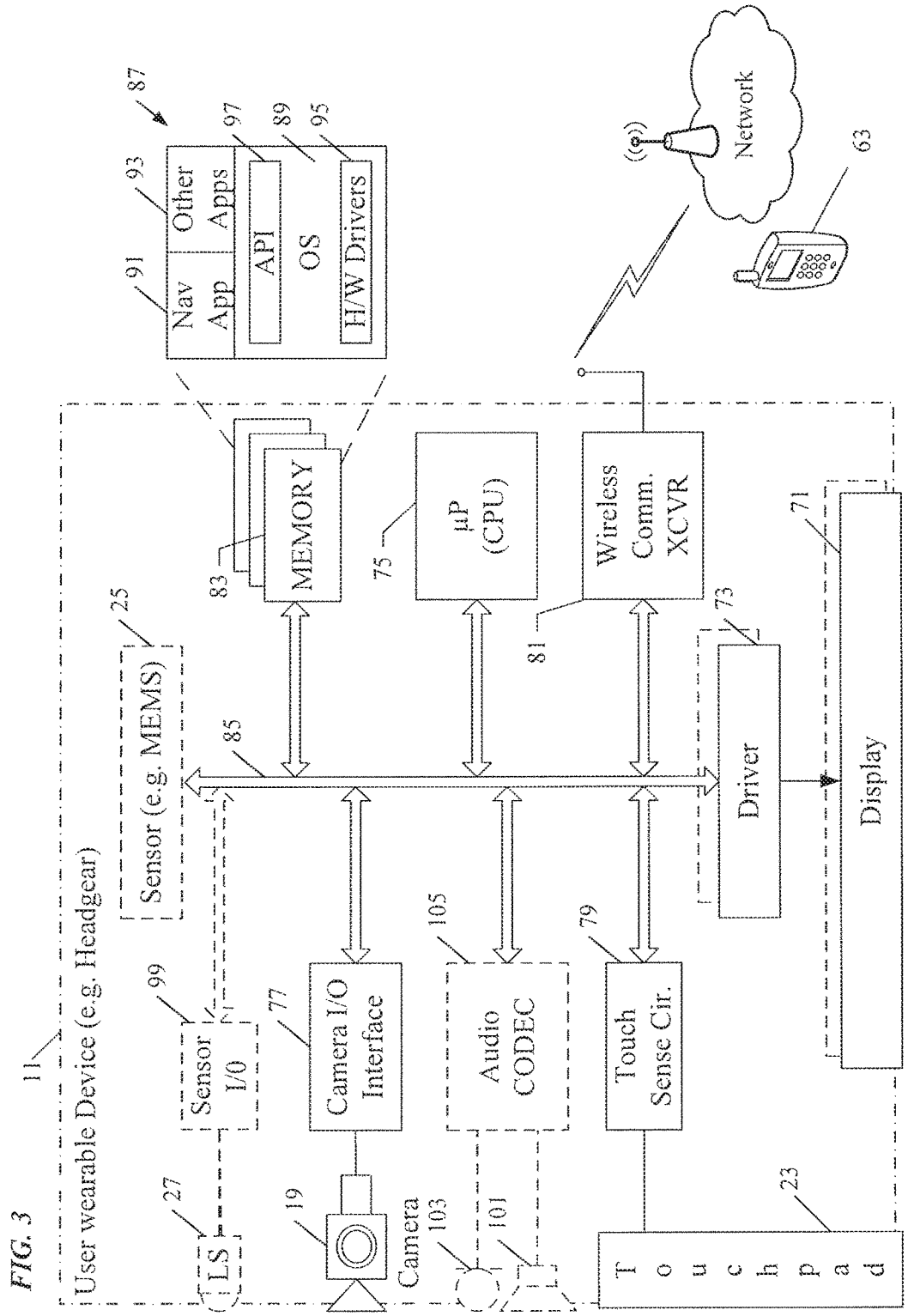
FIG. 3 is a high-level functional block diagram of an example of a user wearable device, configured to provide navigational and other assistance.

The headgear 11 may include one display, e.g. one of the lenses 14L, 14R or a continuous display element extending across the fields of view of both eyes of the user/wearer. 71 represents and single display element in FIG. 3 and is operated via a single display driver circuit 73. Alternatively, the headgear 11 may include two displays, for example, the two lenses 14L and 14R. In this later case, the headgear 11 may utilize one combined driver circuit 73 or two individual display driver circuits. Hence, second display elements and driver circuits are shown in FIG. 2 in dotted line form.

Although other optical input devices may be provided instead of or in addition, the headgear 11 or other user wearable devices in the example includes a camera 19 supported by the framework. Some instances of the devices may include multiple cameras, like in a smartphone or tablet computer; but using current technologies, the wearable headgear 11 will typically include one camera 19 in view of constraints regarding size, weight and power consumption.

The electronics of the headgear 11 in the example also include a camera input output (I/O) interface circuit 77. The camera I/O circuit 77 provides control of the camera operations in response to control instructions from the processor 75 and processes signals from the camera 19 for appropriate communications within the device 11 to other elements. The signal processing of the I/O circuit 77 could provide an analog or digital interface to the camera 19, depending on the particular type of camera, although the internal communications of still images or video captured via the camera will likely use a standardized format. Depending on the technology and/or manufacturer, the camera and I/O circuit may be an integral unit.

The user wearable device 11 in our examples includes a user input supported by the framework. The user input in the example is a touchpad 23. A touchpad 23, for example, may be a capacitive or other type of touch sensor similar to touchpads commonly used today on user terminal type computer devices. Instead of or in addition to the touchpad 23, the user input may include one or some small number of finger-operable buttons or switches (e.g. mounted along or on one or both of the wings of the eyeglass frame).

For the touchpad 23 type of user input, the user wearable device 11 also includes a touch/position sense circuit 79. If signals are required to operate the touch pad, the circuit 79 supplies these signals. The circuit 79 then senses signals from elements of the touchpad 23 and detects occurrence and position of each touch of the pad 23. The sense circuit 79 provides touch position information to the processor 75, which can correlate that information to state(s) of the device 11 and/or to any relevant information currently displayed via the display 71, to determine the nature of user input via the touchpad 23. Depending on the touchpad technology and/or manufacturer, the touchpad 23 and touch sensing circuit 79 may be an integral unit.

Although it may be outside the housing or framework of the device 11, the headgear has a wireless transceiver (XCVR) 81 that supports data communications for the headgear 11. The transceiver 81 provides two-way wireless communication of information, such as user input data for content selection, still or video image data and requested content for display, in accordance with the applicable wireless technology standard and higher level communication protocols. The transceiver 81 also sends and receives a variety of signaling in support of the various communications for the user wearable device 11.

The transceiver 81 may be a cellular or Wi-Fi type radio communication device, for wireless data communications. For low-power operations and/or due to size constraints, the transceiver may be a Bluetooth or other low power wireless data communication transceiver. If the headgear 11 uses Wi-Fi or cellular data communication, the wireless link may go to an access point or base station of the applicable data network, as outlined above relative to FIG. 1. It is also envisioned that the device 11 may use other types of wireless communication technologies, such as Bluetooth, Zigbee, LiFi, IrDA, etc. If the headgear 11 uses lower power data communication technology, the wireless link may be relatively short. In such a case, the wireless link may be with another communication device, such as a smartphone, configured to act as a hotspot access point transceiver, where the other communication device itself has access to a data network.

As noted, the headgear 11 includes a processor 75 that controls device operations as well as one or more memories 83. The one or more memory devices 83 of the user wearable device 11 store programming for execution by the processor and data that is available to be processed or has been processed by the processor. For such purposes, the headgear 11 may use flash memory and/or other miniature memory devices.

Any of the various user wearable devices, including headgear 11, may be implemented using a PC like approach based on any known or available microprocessor architecture, such as a Reduced Instruction Set Computing (RISC) using an ARM architecture, as commonly used today in mobile devices and other portable electronic devices, or a microprocessor architecture more commonly used in computers such as an instruction set architecture (ISA), like those used in Intel microprocessors and the like. The example of FIG. 3 shows the processor in the form of a microprocessor (µP) implementing a central processing unit (CPU) function. The processor 75 is coupled to the one or more memories 83, the display 71, the camera 19, the transceiver 81 and the touchpad input device 23. Although other arrangements may be used, the example shows communications amongst such device elements via a bus network 83. The microprocessor based approaches are discussed by way of examples, with respect to FIG. 2; however, other processor implementations may be used, such as based on a Peripheral Interface Controller (PIC) or other microcontroller architecture.

The memories 83, for example, may include read only memory (ROM), non-volatile random access memory (NV-RAM), and flash memory. The RAM in such an example serves as a working memory for loading instructions for execution and for holding data during data processing. The processor 75 is configured to control operations of the headgear 11 and has access to the programming in the memory devices 83. The memories 83 store programming 87 such as a boot routine (not shown), an operating system 89, application programs, 91, 93 as well as configuration data or settings. Of course, other storage devices or configurations may be added to or substituted for those discussed in this example.

The operating system 89 includes or works through hardware (H/D) device driver software 95 to enable the processor 75 to communicate with and control the other elements of the device 11. The operating system also implements one or more application program interfaces (APIs) 97. The API allows application layer programming to operate on the device through the operating system 89 to utilize various features, functions and physical components of the device 11. The API provides a published interface standard to allow applications written in conformance with that standard to execute on the processor 75 and operate via the operating system 89.

For example, execution of the operating system 89 provides a graphical user interface (GUI) for the user when wearing the headgear, via the display 71 and the touchpad 23 (or other user input). The GUI may be an overlay on the rendering of a room (for example, overlaying the example room rendering of FIG. 2) or may be presented in a border area of the displayed images. In this way, various combinations of the touchpad 23 (and/or other button or key inputs if provided), display (and possibly any other input/output devices if provided) may be used as the physical input output elements of the GUI. Applications running on top of the operating system 89 can in turn use and adapt that GUI to respective purposes of the applications.

Considering Microsoft HoloLens™ by way of an example of suitable headgear 11, a Microsoft HoloLens™ device runs a variant of Microsoft Windows™, referred to as Microsoft Holographic™, as the operating system 89. The navigation application 91 and any other applications 93 would be written to run through Microsoft Holographic™. Of course, other operating systems may be used.

The headgear 11 may have and run any appropriate number of applications, including one or more lighting related applications. To illustrate the point, the drawing shows the programming 87 including a navigation application 91 as well as some number of other applications 93 for other purposes or services of the user wearable device 11. In addition to normal operations of the user wearable device, the programming for the processor configures the headgear to perform lighting related operations.

The navigation application 91, for example, configures the user wearable device to provide one or more navigation functions for the user wearing the headgear, with respect to a room mapping including object identification and unobstructed pathway information and indications observable to the user while wearing the headgear. For example, execution of the Navigation application 91 adapts a graphical user interface (GUI) for navigation related operations, including for the presentation of navigation information, such as object edge enhancement, unobstructed pathway information and/or directional indications via the display 71.

In support of several examples of methods of device operation outlined above, the lighting application 91 configures the user wearable device 11 for specific functions relating to a lighting device or system observable by the user while wearing the headgear, some of which utilize input and/or output via the GUI of the headgear 11. The navigation related functions, for example, may include, processing of a still or moving (video) image obtained via the camera 19 to capture perspective information related to a user's view of the room in which the user is located, for example, in response to a selection via the touchpad 23 as the user input device. Then, based on the captured perspective information, the headgear 11 uses the transceiver 81 to wirelessly communicate to obtain navigational information with respect to the premises via a communication network and present the obtained information to the user while wearing headgear, via the heads-up display 71.

As another example, the user wearing the headgear 11 may activate the touchpad 23 several times to select among available applications for the processor to run, so as to pick the lighting related application. In response to this latter type of selection, the headgear 11 wakes the navigation application and provides an initial display with respect to the navigation application on the display 71. Either in response to application launch or in response to a later selection by the user, the navigation application causes the camera 19 to operate and capture a desired image or video.

In the example of FIG. 3, the headgear includes a processor and display for processing camera images and/or received or image-captured data on a display. Displayable information, however, may be received and presented in other ways. For example, a system in the vicinity, such as an intelligent lighting system 35, may interact with room mapping-related devices (electronic signal-emitting (e.g., Bluetooth Low Energy) indicators, reflective tape and the like placed on furniture or on devices in a room) or room-related objects information that a human user may be able to observe and discern with some degree of optical processing by the wearable device. For example, a lighting fixture might modulate its light output in a complex way that a normal viewer (without the user wearable device) would not detect, at least not in any meaningful way. A user wearing appropriately configured headgear, however, would be able to see the reaction of room-related devices or indicators, such as flashes. The reactions may be presented in a number of ways by the headgear. To receive the transmitted information, in such an example, the headgear would have a processor, a communications network interface and a relatively passive lens configured to make the reactions discernible, but the displayed reactions are only visible to a person using the special lenses.

As noted in the discussion of FIG. 1, the user wearable device 11 may include one or more additional sensors, represented by way of example by the sensors 25 and 27.

The sensor 25 represents one or more devices that may be included in the headgear to sense orientation and/or movement of the headgear while worn by the user. By way of an example, the sensor 25 may be or include micro-scale components such as an accelerometer, a gyroscope and/or a field strength and direction sensing magnetometer, for example, implemented using Micro-Electromechanical Systems (MEMS) similar to devices used in smartphones or the like to detect direction (e.g. compass heading), elevation angle, motion and/or acceleration.

If provided, the additional light sensor 27 may be a quadrant hemispherical detector (QHD), a light intensity sensor, and/or a color characteristic sensor, etc. To support communication of information from the sensor 27 and the other system device elements, e.g. the processor 75, the memories 83 and/or transceiver 81, the headgear may include a sensor input/output circuit 99. Such a circuit 99, for example, would process signals from the particular sensor(s) 27 for communication in the appropriate digital format over the bus network 85. Although shown separately, depending on the technology and/or manufacturer, a particular optical sensor 27 and its associated the sensor I/O circuit 99 may be an integral unit configured to have a standard interface connection to the bus 85 or other media used in the user wearable device 11.

In addition to the elements discussed above, the user wearable device 11 may include a number of still further elements. For example, if the device 11 is intended to support audio, the device may include a speaker 101 and/or a microphone 103. A speaker 101 provides an audio signal output. A speaker 101, for example, may be incorporated into an earpiece at the distal end of one of the wings 17R, 17L or take the form of an earphone connected thereto. Instead of a traditional speaker, the audio output could be a bone conduction device; and other audio input technologies may be substituted for the microphone in the example. If included, the user wearable device 11 includes a microphone 103 provides an audio signal input. If provided, the speaker 101 and microphone 103 connect to voice coding and decoding circuitry (Audio codec) 105. The speaker and/or microphone provide additional user output/input elements for the user interface functions. For example, the device may be configured to sense spoken commands via the microphone 103 and to provide an audio output of lighting-related information via the speaker 101. In addition, audio navigational commands may be generated such as "turn left," "turn right," "move to your right," "stop," "the tablet is in front of you," and the like. Other user wearable devices may include mouth-borne devices, such as a mouthpiece, such as BrainPort® V110, an audio device such as the vOICe, speech synthesizers, tactile or haptic devices, such as gloves, or the like.

A sensor (not shown) may also be included to allow tracking of the user's eye movement while wearing the headgear 11, e.g. to identify a portion of displayed information or an object viewed through the lenses (as being captured in any image input via the camera).

It may be appropriate at this time to discuss how the above described system and device examples interact according to an example process for providing navigational instructions and indications to a visually impaired user. FIG. 4 is a flow chart of a process for generating the area rendering example of FIG. 2 that is provided by the system of FIG. 1. The process 400 begins with a processor of a lighting device located in an area executing programming code of a navigational application. A lighting device sensor, such as a mapping device, collects at 410 mapping data of an area of a premises. For example, the mapping data may include boundaries of a room and objects within the room, such as objects 58 of FIG. 1. The mapping data collected by the lighting device mapping sensor may be stored in a memory of the lighting device, may be sent by the lighting device processor, via a network communication interface, to a server or data storage for image processing services. The image processing services, which may be performed by a processor of the lighting device, a processor of another lighting device, such as a LEADER lighting device, or by a processor in the server, may, at 420, identify objects in the area of the premises from the mapping data. For example, as described above with respect to FIG. 2, the edges of objects, such as the table 210 and chairs 220 and 240 may be enhanced using known edge enhancement image processing techniques. Upon completion of the image processing of collected mapping data, the mapping data and an indication of the identified objects may be stored by the processor that performs the image processing in memory, such as data storage 46 or in the memory of the lighting device that collected the mapping data. At 430, in response to a request from a user wearable device, such as user wearable device 11, the mapping data and the indications of the identified objects are provided, as first area mapping data, to the user wearable device. The user wearable device, at 440, outputs navigational instructions that indicate an unobstructed pathway through the area based on the provided mapping data and indications of the identified objects. The outputted navigational instructions may be visual stimuli, such as arrows or boundary lines, or may be audio stimuli, such as "turn right" or "turn left," or may be tactile stimuli provided by the user wearable device. In the case of the user wearable device being a bracelet, an example of tactile stimuli may be pressure applied to the skin of a user at different locations, such as a slight pressure on the left wrist indicates a gradual movement to the left, whereas a sharper pressure on the left wrist indicates a more abrupt movement to the left. Combinations of stimuli, such an audio stimuli in combination with a tactile stimuli (presented either in parallel or serially) may indicate a first navigational instruction, while a different combination of stimuli indicates a second navigational instruction.

In order to accommodate movement of objects in the room (e.g., other persons, animals, objects, such as cars on the street adjacent to the user or the like) or as the user traverses an area, the mapping data will need to be updated by the mapping sensor collecting updated data. As a result, the mapping data of the area of the premises is updated to identify locations of moveable objects within the area as the moveable objects move within the area (Step 450). Using the updated mapping data, objects in the area are identified by either a server or a processor at 460 according to known object recognition processes. The updated mapping data and updated indications of the identified objects may be stored in memory and/or data storage. The updated mapping data and updated indications of the identified objects is, for example, compared to the first area mapping data including the identified object indications to the updated mapping data and the updated indications of the identified objects stored in memory (470). Based on the results of the comparison, the processor or server, at 480, generates updated mapping data and updated indications of the identified objects to the user device. The generated updated mapping data and updated indications may only be the data in the updated collected data that changed in comparison to the first area mapping data. The updating of mapping data may be continuous. Alternatively, the comparison step at 470 may be omitted and all of the processed updated data is provided to the user wearable device to replace the first area mapping data in its entirety.

Using the updated mapping data, the navigational instructions are updated to indicate an updated unobstructed pathway through the area based on the provided updated mapping data and updated indications of the identified objects (490).

Figure 7:
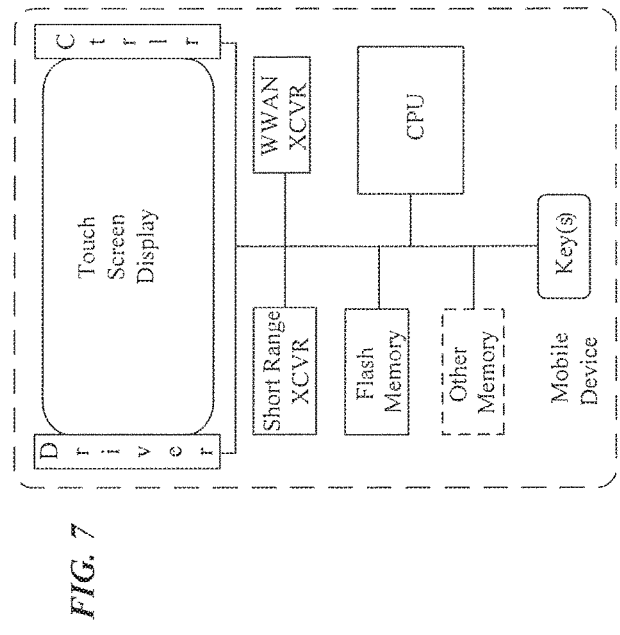
FIG. 7 is a simplified functional block diagram of a mobile device, as an alternate example of a user terminal device, for possible communication in or with a system like that of FIG. 1.
Figure 6:
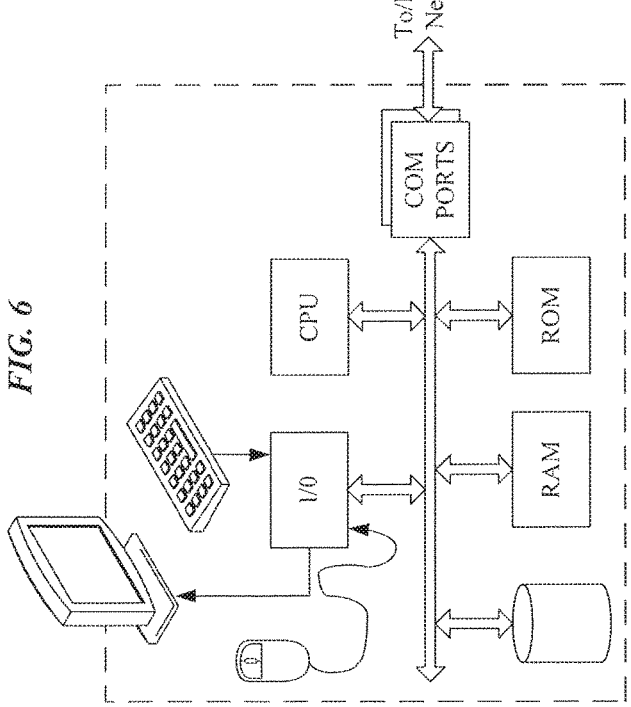
FIG. 6 is a simplified functional block diagram of a personal computer or other user terminal device, which may be used as the remote access terminal, in a system like that of FIG. 1.
Figure 5:
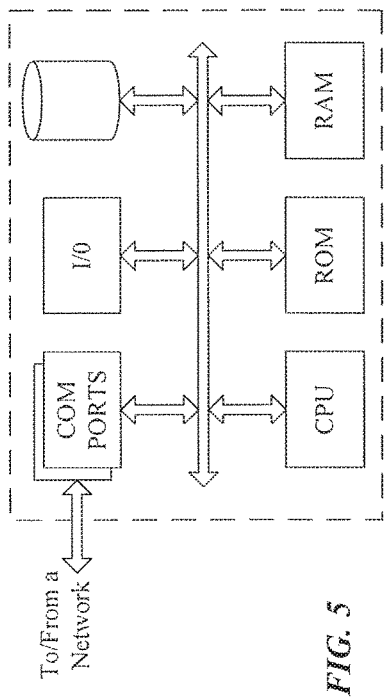
FIG. 5 is a simplified functional block diagram of a computer that may be configured as a host or server, for example, to function as the server in a system like that of the example of FIG. 1.

As shown by the above discussion, at least some functions of devices associated or in communication with the networked system encompassing the intelligent lighting devices 37 of FIG. 1, with which user wearable device 11 or other types of user wearable device may communicate, may be implemented with general purpose computers or other general purpose user terminal devices, although special purpose devices may be used. FIGS. 5-7 provide functional block diagram illustrations of exemplary general purpose hardware platforms.

FIG. 5 illustrates a network or host computer platform, as may typically be used to implement a host or server, such as the computer 57. FIG. 6 depicts a computer with user interface elements, as may be used to implement a personal computer or other type of work station or terminal device, such as terminal device 59, although the computer of FIG. 6 may also act as a server if appropriately programmed. The block diagram of a hardware platform of FIG. 7 represents an example of a mobile device, such as a tablet computer, smartphone (e.g. 63 in FIG. 1) or the like with a network interface to a wireless link, which may alternatively serve as a user wearable device similar to device 11, but in other form factors. It is believed that those skilled in the art are familiar with the structure, programming and general operation of such computer equipment and as a result the drawings should be self-explanatory.

A server (see e.g. FIG. 5), for example, includes a data communication interface for packet data communication via the particular type of available network. The server also includes a central processing unit (CPU), in the form of one or more processors, for executing program instructions. The server platform typically includes an internal communication bus, program storage and data storage for various data files to be processed and/or communicated by the server, although the server often receives programming and data via network communications. The hardware elements, operating systems and programming languages of such servers are conventional in nature, and it is presumed that those skilled in the art are adequately familiar therewith. Of course, the server functions may be implemented in a distributed fashion on a number of similar platforms, to distribute the processing load. Also, a computer configured as a server with respect to one layer or function may be configured as a client of a server in a different layer and/or for a different function.

A computer type user terminal device (see FIG. 6), such as a desktop or laptop type personal computer (PC), similarly includes a data communication interface CPU, main memory (such as a random access memory (RAM)) and one or more disc drives or other mass storage devices for storing user data and the various executable programs. A mobile device (see FIG. 7) type user terminal may include similar elements, but will typically use smaller components that also require less power, to facilitate implementation in a portable form factor. The example of FIG. 7 includes a wireless wide area network (WWAN) transceiver (XCVR) such as a 3G or 4G cellular network transceiver as well as a short range wireless transceiver such as a Bluetooth and/or WiFi transceiver for wireless local area network (WLAN) communication. The computer terminal, or more likely the mobile device, may provide wireless communication capability to/from a user wearable device such as headgear 11 and then use its own network connection to provide network access for the user wearable device. The computer hardware platform of FIG. 6 and the terminal computer platform of FIG. 7 are shown by way of example as using a RAM type main memory and a hard disk drive for mass storage of data and programming, whereas the mobile device of FIG. 7 includes a flash memory and may include other miniature memory devices. It may be noted, however, that more modern computer architectures, particularly for portable usage, are equipped with semiconductor memory only.

The various types of user terminal devices will also include various user input and output elements. A computer, for example, may include a keyboard and a cursor control/selection device such as a mouse, trackball, joystick or touchpad; and a display for visual outputs (see FIG. 5). The mobile device example in FIG. 5 touchscreen type display, where the display is controlled by a display driver, and user touching of the screen is detected by a touch sense controller circuit (Ctrlr.). The hardware elements, operating systems and programming languages of such computer and/or mobile user terminal devices also are conventional in nature, and it is presumed that those skilled in the art are adequately familiar therewith.

Although FIGS. 5-7 in their present form show computers and user terminal devices, generally similar configurations also may be used within other elements of the lighting system and/or as user wearable devices. For example, one implementation of the brain, communication and interface elements of a lighting device may utilize an architecture similar to that of one of the computers or mobile terminals. As a more specific example, the personal computer type hardware in FIG. 6 (except for the keyboard, mouse and display) could serve as the brain and communication elements of a lighting device, where the input/output interface I/O would interface to an appropriate light driver and to any sensor(s) or other enhancement input or output device(s) included within the lighting device. As another example, some types of user wearable devices might utilize an arrangement similar to the mobile device of FIG. 7, albeit possibly with only one wireless transceiver compatible with the relevant networking technology and smaller/lower capacity electronics and display (e.g. to reduce costs, size and/or power consumption).

As also outlined above, aspects of the lighting related operations of the user wearable device and any other types of user wearable device that might offer a similar visually-impaired user navigational assistance system interactions vis-á-vis lighting may be embodied in programming of the lighting device(s), the appropriate system headgear or other type of interface device, e.g. particularly for the processors of user wearable device devices 11 or the like. Program aspects of the technology discussed above therefore may be thought of as "products" or "articles of manufacture" typically in the form of executable code and/or associated data (software or firmware) that is carried on or embodied in a type of machine readable medium. "Storage" type media include any or all of the tangible memory of the computers, processors or the like, or associated modules thereof, such as various semiconductor memories, tape drives, disk drives and the like, which may provide non-transitory storage at any time for the software or firmware programming. All or portions of the programming may at times be communicated through the Internet or various other telecommunication networks. Such communications, for example, may enable loading of the user wearable device, navigational programming, and image processing including object recognition and data management computer application software from one computer or processor into another, for example, from a management server or host computer of a lighting system service provider (e.g. implemented like the server computer shown at 57) into any of the lighting devices 37 or the user wearable devices such as headgear 11. Thus, another type of media that may bear the software/firmware program elements includes optical, electrical and electromagnetic waves, such as used across physical interfaces between local devices, through wired and optical landline networks and over various air-links. The physical elements that carry such waves, such as wired or wireless links, optical links or the like, also may be considered as media bearing the software. As used herein, unless restricted to non-transitory, tangible, "storage" type media, terms such as computer or machine "readable medium" refer to any medium that participates in providing instructions to a processor for execution.

It will be understood that the terms and expressions used herein have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any actual such relationship or order between such entities or actions. The terms "comprises," "comprising," "includes," "including," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a" or "an" does not, without further constraints, preclude the existence of additional identical elements in the process, method, article, or apparatus that comprises the element.

Unless otherwise stated, any and all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain.

While the foregoing has described what are considered to be the best mode and/or other examples, it is understood that various modifications may be made therein and that the subject matter disclosed herein may be implemented in various forms and examples, and that they may be applied in numerous applications, only some of which have been described herein. It is intended by the following claims to claim any and all modifications and variations that fall within the true scope of the present concepts.

What is claimed is:

1. A system, comprising:
    a lighting device in an area of a premises, the lighting device including:
        a lighting device processor,
        a wireless communication transceiver,
        a light source, and
        a memory that stores programming instructions, wherein the lighting device processor is coupled to the wireless communication transceiver, the memory, and the light source; and
    a data storage for maintaining processed mapping data and mapping information of an area of the premises in which the lighting device is located, wherein:
        the processed mapping data is area mapping data that has been processed using image processing techniques, and
        the mapping information includes navigational information or indications;
    wherein the lighting device processor when executing the programming instructions stored in the memory configures the lighting device processor to control operations of the lighting device and perform functions, including functions to:
        in response to a request for processed mapping data, deliver processed mapping data for the area of the premises in which the lighting device is located to a user device;
        update the mapping data for the area of the premises to identify locations of moveable objects within the area as the moveable objects move within the area; and
        use the updated mapping data as the user device moves within the area.

2. The system of claim 1, wherein the delivered processed mapping data includes one or more of object identifications, object boundaries indications, navigation instructions or navigation indicators.

3. The system of claim 1, wherein the wireless communication transceiver is configured to send or receive data via radio frequency wireless communication.

4. The system of claim 1, wherein the wireless communication transceiver is configured to perform as least one of sending or receiving data as a communication via light.

5. The system of claim 1, further comprising:
    a mapping sensor configured to collect mapping data related to the area of the premises in which the lighting device is located, the mapping sensor coupled to the lighting device processor; and
    a server, coupled to the lighting device processor and the database, the server configured to provide image processing services, the image processing services including identifying objects, object boundaries, and inserting as area mapping information navigation instructions and indicators in the processed mapping data; and
    wherein the lighting device memory stores programming, and execution of the programming by the lighting device processor configures the lighting device processor to perform further functions, including functions to:
        instruct the mapping sensor to collect mapping data of the area of the premises in which the lighting device is located; and
        send the collected mapping data to the server for image processing.

6. The system of claim 5, wherein the lighting device memory stores programming, and execution of the programming by the lighting device processor configures the lighting device to perform functions, including functions to:
    sending a lighting device identifier to the server with the collected mapping data, wherein the lighting device identifier uniquely identifies the location of the lighting device in the premises.

7. The system of claim 1, further comprising:
    a mapping sensor configured to collect mapping data related to the area of the premises in which the lighting device is located, the mapping sensor coupled to the lighting device processor; and
    wherein the lighting device memory stores programming, and execution of the programming by the lighting device processor configures the lighting device processor to perform further functions, including functions to:
        instruct the mapping sensor to collect mapping data of the area of the premises in which the lighting device is located;
        generate processed mapping data by image processing the collected mapping data; and
        store the processed mapping data in the lighting device memory.

8. The system of claim 7, wherein the lighting device memory stores programming, and execution of the programming by the lighting device processor configures the lighting device processor to perform further functions, including functions to:
    after generating the processed mapping data, forward a copy of the processed mapping data to the data storage.

9. The system of claim 1, wherein the system includes a user device, wherein the user device further comprises:
    an output device, a user device processor, a user device wireless communication transceiver, and a user device memory, wherein:
the user device processor is coupled to the user device wireless communication transceiver and the user device memory, the user device processor being configured to control operations of the user device,
the user device memory stores programming instructions, and execution of the programming instructions by the user device processor configures the user device processor to perform functions, including functions to:
send a request for mapping data, via the user device wireless communication transceiver, related to a premises location of the user wearable device;
receive, from the lighting device, the processed mapping data specific to the premises location of the user device; and
based on the processed mapping data, output, via the output device, user detectable stimuli suitable for navigating a user through the area of the premises.

10. The system of claim 9, wherein the output device of the user device includes:
an audio output device, and the outputted user detectable stimuli is an audio prompt indicating a direction of travel for a user of the user device.

11. The system of claim 9, wherein the output device of the user wearable device comprises:
an audio output device, and the outputted user detectable stimuli is an audio prompt indicating objects in an area surrounding the determined location of the user device.

12. The system of claim 9, wherein the output device of the user device comprises:
a display configured to provide an augmented reality display of an area surrounding the determined location of the user wearable device, and the outputted user detectable stimuli are visual prompts indicating locations of objects with the area surrounding the determined location of the user device.

13. The system of claim 9, wherein the user device includes:
a tactile device that outputs tactile stimuli indicative of a navigation path around objects in an area surrounding the determined location of the user wearable device.

14. The system of claim 9, wherein the user device comprises an eyewear frame having a structure to configure the user interface device to be worn as goggles or eyeglasses.

15. A method, comprising:
in response to a request from a user device, providing, as first area mapping data of an area of a premises, mapping data and indications of identified objects from a lighting device to a user device, wherein the lighting device is located in the area of the premises;
enable the user device to present navigational instructions that indicate an unobstructed pathway through an area of a premises in which the lighting device is locate based on the first area mapping data;
updating the mapping data of the area of the premises to identify locations of moveable objects within the area as the moveable objects move within the area; and
using the updated mapping data as the user device moves within the area.

16. The method of claim 15, further comprising:
collecting, by a lighting device mapping sensor, mapping data of an area of a premises to be illuminated by the lighting device;
identifying objects in the area of the premises from the collected mapping data; and
storing the collected mapping data and an indication of the identified objects in a memory associated with the lighting device.

17. The method of claim 15, further comprising:
identifying objects in the area using the updated mapping data as the user device moves in the area;
updating indications of the identified objects based on the identified objects from the updated mapping data;
storing the updated mapping data and updated indications of the identified objects in memory;
comparing the first area mapping data including identified object indications to the updated mapping data and the updated indications of the identified objects stored in memory;
based on the results of the comparison, providing updated mapping data and updated indications of the identified objects to the user device; and
enabling the user device to update navigational instructions to indicate an updated unobstructed pathway through the area based on the provided updated mapping data and updated indications of the identified objects.

18. The method of claim 15, further comprising:
determining a location of the user device in the premises using visible light communication between the lighting device and the user device; and
based on the determined position of the user device, accessing mapping data corresponding to the determined location of the user device in the premises to be provided to the user device.

19. The method of claim 18, wherein determining a location of the user device, comprises:
transmitting, by the lighting device, an identifier of the at least one lighting device in visual light communication signals transmitted into the area of the premises;
receiving as part of the request from the user device the identifier of the at least one lighting device;
comparing the identifier to a premises plan that identifies locations of each of the number of lighting devices; and
based on the results of the comparison, determining a location of the at least one lighting device and the user device.

20. The method of claim 15, further comprising:
receiving the first area mapping data;
determining a viewing perspective of the area based on an input from the user device;
transforming the first area mapping data based on the determined viewing perspective of the area; and
rendering a two dimensional view of the area based on the first area mapping data.

21. A lighting device, comprising:
a processor;
a wireless communication transceiver coupled to the processor and to a network;
a light source responsive to commands from the processor;
a memory accessible to the processor; and
programming instructions stored in the memory, wherein execution of the programming instructions by the processor configures the lighting device to perform functions, including functions to:
in response to a request from a user device in the area of the premises, retrieve mapping data of an area of a premises in which the lighting device is located;
deliver the mapping data of the area to the user device via the wireless communication transceiver;

update the mapping data of the area with locations of movable objects in the area based on user device inputs indicating a movable object location in the area;

in response to a user device query, generate an indication of the movable object location based on the updated mapping data; and deliver the indication based on the updated mapping data to the user device.

22. The lighting device of claim 21, wherein the generated indication is at least one of a visible light communication signal receivable by a user device in communication with the lighting device within the area, a non-visible light communication signal receivable by a user device in communication with the lighting device within the area, a radio frequency signal receivable by a user device in communication with the lighting device within the area, or an audio signal.

23. The lighting device of claim 21 further comprising:
a mapping sensor, coupled to the processor;
wherein upon execution of the programming stored in the memory by the processor configures the lighting device to perform further functions, including functions to:
instruct the mapping sensor to collect mapping data related to the area in which the lighting device is located;
process the collected mapping data to identify objects within the area; and
store the processed mapping data including indicators of objects within the area in the memory.

24. The lighting device of claim 23, wherein upon execution of the programming stored in the memory by the processor configures the lighting device to perform further functions, including functions to:
process the collected mapping data to identify unobstructed pathways within the area; and
update mapping data of the area with locations of unobstructed pathways within the area.

25. The lighting device of claim 23, further comprising:
a microphone for receiving voice inputs;
programming stored in in the memory for performing a voice recognition algorithm, wherein the processor upon executing the programming stored in the memory by the processor configures the lighting device to perform further functions, including functions to:
recognize spoken mapping commands that identify the location of objects within the area; and
based on the recognized mapping commands, the processor updates the mapping data based on the recognized spoken mapping command.

26. A user wearable device, comprising:
a framework configured to enable a visually impaired user to wear the user wearable device;
a display supported by the framework so as to be viewable by at least one eye of the visually impaired user when wearing the user wearable device;
a processor, supported by the framework, coupled to the display, and the input, the processor being configured to control operations of the user wearable device;
a memory accessible to the processor and supported by the framework; and programming in the memory, wherein execution of the programming by the processor configures the user wearable device to perform functions, the programming including:
an operating system to control general operating functions of the user wearable device; and
a navigation application for execution via the operating system, to configure the user wearable device to provide one or more navigational instructions or indications for presentation on the display, wherein:
the navigational instructions or indications are viewable by the visually impaired user as overlay markings on edges of object outlines and on boundaries of unobstructed pathways into and through an area surrounding a determined location of the user wearable device, and
the boundaries of the unobstructed pathways are displayed differently from the edges of the object outlines.

27. The user wearable device of claim 26, further comprising:
an audio output device; and
the processor, upon execution of programming in the memory, is further configured to:
output, via the audio output device, user detectable audio stimuli as an audio prompt indicating a direction of travel for a user wearing the user wearable device.

28. The user wearable device of claim 26, further comprising:
an audio output device, and
the processor, upon execution of programming in the memory, is further configured to:
output, via the audio output device, user detectable audio stimuli as an audio prompt indicating objects in an area surrounding the determined location of the user wearable device.

29. The user wearable device of claim 26, further comprising:
a tactile device; and
the processor, upon execution of programming in the memory, is further configured to:
output, via the tactile device, user detectible tactile stimuli indicative of a navigation path around objects in an area surrounding the determined location of the user wearable device.

30. The user wearable device of claim 26, wherein the framework comprises:
an eyewear frame having a structure to configure the user wearable device to be worn as goggles or eyeglasses.

31. The user wearable device of claim 26, further comprising:
a camera supported by the framework; and
a wireless communication transceiver supported by the framework,
framework,
wherein:
the camera is configured to capture an image of an area in which the user wearable device is located, and
wireless configuration transceiver is configured to receive navigational information from a lighting device.

* * * * *